(12) United States Patent
Takeuchi

(10) Patent No.: US 11,381,722 B2
(45) Date of Patent: *Jul. 5, 2022

(54) ELECTROMAGNETIC WAVE DETECTION APPARATUS AND INFORMATION ACQUISITION SYSTEM

(71) Applicant: KYOCERA Corporation, Kyoto (JP)

(72) Inventor: Eri Takeuchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/051,291

(22) PCT Filed: May 8, 2019

(86) PCT No.: PCT/JP2019/018378
§ 371 (c)(1),
(2) Date: Oct. 28, 2020

(87) PCT Pub. No.: WO2019/220974
PCT Pub. Date: Nov. 21, 2019

(65) Prior Publication Data
US 2021/0368075 A1    Nov. 25, 2021

(30) Foreign Application Priority Data

May 15, 2018 (JP) .............................. JP2018-094102

(51) Int. Cl.
*G01S 17/89* (2020.01)
*H04N 5/225* (2006.01)
(Continued)

(52) U.S. Cl.
CPC ........... *H04N 5/2254* (2013.01); *G01S 17/89* (2013.01); *G02B 5/04* (2013.01); *G02B 27/126* (2013.01);
(Continued)

(58) Field of Classification Search
None
See application file for complete search history.

(56) References Cited

U.S. PATENT DOCUMENTS

| 2003/0132405 | A1 | 7/2003 | Some | |
| 2012/0038817 | A1* | 2/2012 | McMackin | .......... H04N 5/2354 348/345 |
| 2013/0002858 | A1* | 1/2013 | Bridge | .......... H04N 19/97 348/135 |

FOREIGN PATENT DOCUMENTS

| EP | 2 957 926 A1 | 12/2015 |
| JP | 3507865 B2 | 3/2004 |

(Continued)

*Primary Examiner* — Shadan E Haghani
(74) *Attorney, Agent, or Firm* — Studebaker & Brackett PC

(57) ABSTRACT

An electromagnetic wave detection apparatus (10) includes a first propagation unit (16), second propagation unit (17), first detector (19), and second detector (20). The first propagation unit (16) propagates electromagnetic waves incident on a reference surface (ss) in a particular direction at each pixel (px). The second propagation unit (17) includes first through sixth surfaces (s1 to s6). The second surface (s2) separates electromagnetic waves propagated in a second direction (d2) and propagates the electromagnetic waves in a third direction (d3) and fourth direction (d4). The fourth surface (s4) emits electromagnetic waves propagated in the fourth direction (d4) towards the reference surface (ss) and propagates electromagnetic waves incident again from the reference surface (ss) in a fifth direction (d5). The first detector (19) detects electromagnetic waves emitted from the third surface (s3). The second detector (20) detects electromagnetic waves emitted from the sixth surface (s6).

13 Claims, 17 Drawing Sheets

(51) Int. Cl.
*G02B 5/04* (2006.01)
*G02B 27/12* (2006.01)
*G01S 7/481* (2006.01)
*G02B 26/08* (2006.01)
*G02B 26/10* (2006.01)

(52) U.S. Cl.
CPC .......... *H04N 5/2258* (2013.01); *G01S 7/4816* (2013.01); *G01S 7/4817* (2013.01); *G02B 26/0833* (2013.01); *G02B 26/10* (2013.01)

(56) References Cited

FOREIGN PATENT DOCUMENTS

| | | |
|---|---|---|
| JP | 2013-150146 A | 8/2013 |
| WO | 2012/021450 A1 | 2/2012 |

\* cited by examiner

ELECTROMAGNETIC WAVE DETECTION APPARATUS AND INFORMATION ACQUISITION SYSTEM

CROSS-REFERENCE TO RELATED APPLICATION

The present application claims priority to and the benefit of Japanese Patent Application No. 2018-94102 filed May 15, 2018, the entire contents of which are incorporated herein by reference.

TECHNICAL FIELD

The present disclosure relates to an electromagnetic wave detection apparatus and an information acquisition system.

BACKGROUND

Apparatuses provided with devices that switch the propagation direction of electromagnetic waves incident on each pixel, such as a Digital Micro mirror Device (DMD), are known. For example, a known apparatus first forms a primary image of an object on the DMD surface and then further causes the primary image on the DMD surface to pass through a lens and form a secondary image on a CCD surface. For example, see patent literature (PTL) 1.

CITATION LIST

Patent Literature

PTL 1: JP 3507865 B2

SUMMARY

An electromagnetic wave detection apparatus according to a first aspect includes:

a first propagation unit including a plurality of pixels along a reference surface and configured to propagate electromagnetic waves incident on the reference surface in a particular direction at each pixel;

a second propagation unit including a first surface configured to propagate electromagnetic waves incident from a first direction in a second direction, a second surface configured to separate the electromagnetic waves propagated in the second direction and propagate the electromagnetic waves in a third direction and a fourth direction, a third surface configured to emit the electromagnetic waves propagated in the third direction, a fourth surface configured to emit the electromagnetic waves propagated in the fourth direction towards the reference surface and to propagate electromagnetic waves incident again from the reference surface in a fifth direction, a fifth surface configured to propagate the electromagnetic waves propagated in the fifth direction in a sixth direction, and a sixth surface configured to emit the electromagnetic waves propagated in the sixth direction;

a first detector configured to detect the electromagnetic waves emitted from the third surface; and a second detector configured to detect the electromagnetic waves emitted from the sixth surface.

An information acquisition system according to a second aspect includes electromagnetic wave detection apparatus including a first propagation unit including a plurality of pixels along a reference surface and configured to propagate electromagnetic waves incident on the reference surface in a particular direction at each pixel; a second propagation unit including a first surface configured to propagate electromagnetic waves incident from a first direction in a second direction, a second surface configured to separate the electromagnetic waves propagated in the second direction and propagate the electromagnetic waves in a third direction and a fourth direction, a third surface configured to emit the electromagnetic waves propagated in the third direction, a fourth surface configured to emit the electromagnetic waves propagated in the fourth direction towards the reference surface and to propagate electromagnetic waves incident again from the reference surface in a fifth direction, a fifth surface configured to propagate the electromagnetic waves propagated in the fifth direction in a sixth direction, and a sixth surface configured to emit the electromagnetic waves propagated in the sixth direction; a first detector configured to detect the electromagnetic waves emitted from the third surface; and a second detector configured to detect the electromagnetic waves emitted from the sixth surface; and a controller configured to acquire information related to surroundings based on an electromagnetic wave detection result from the first detector and the second detector.

DETAILED DESCRIPTION

Figure 1:
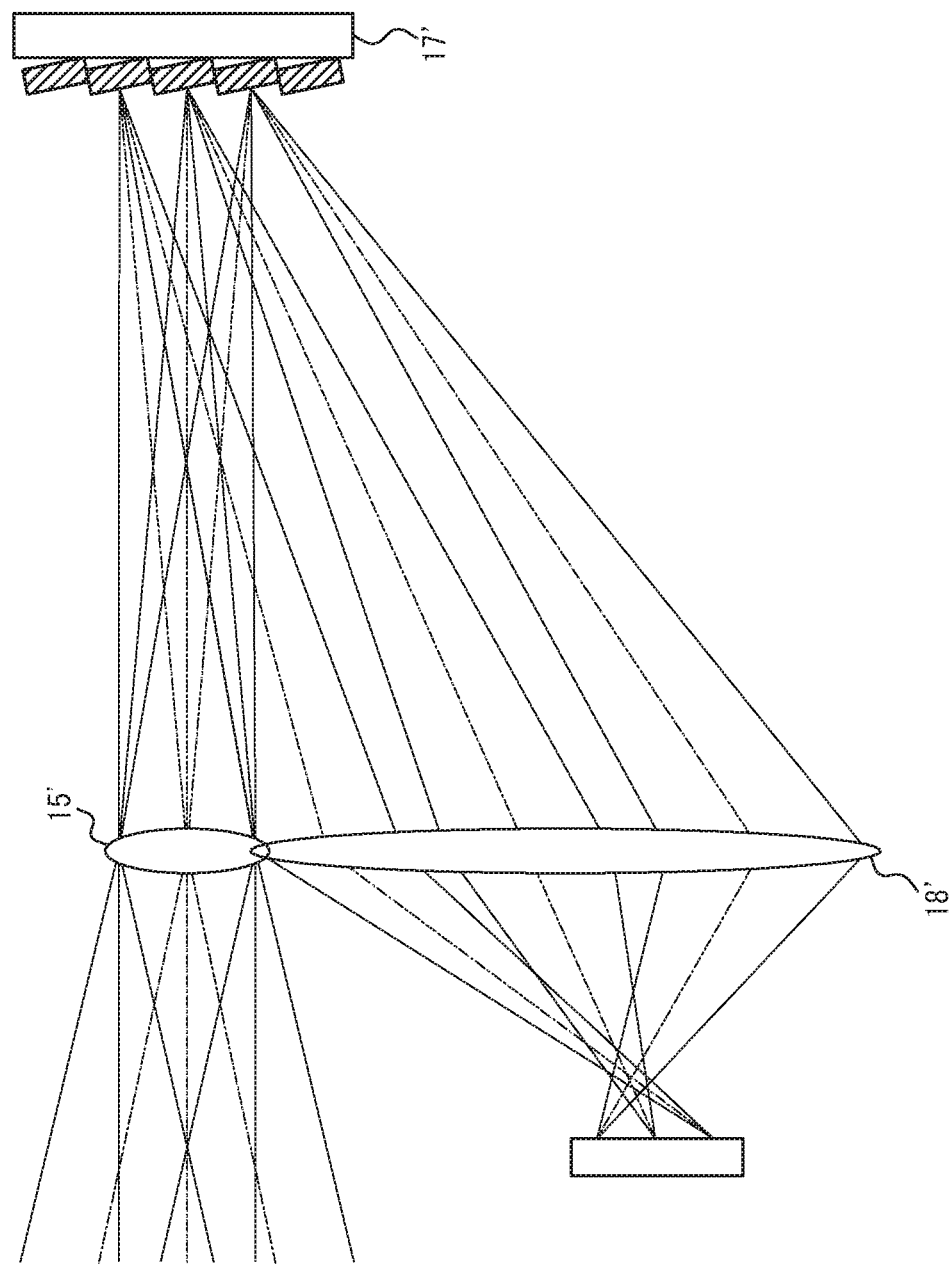
FIG. 1 illustrates the configuration of an electromagnetic wave detection apparatus to cause electromagnetic waves propagated in a propagation direction by a first propagation unit to enter a secondary imaging optical system without leakage.
Figure 2:
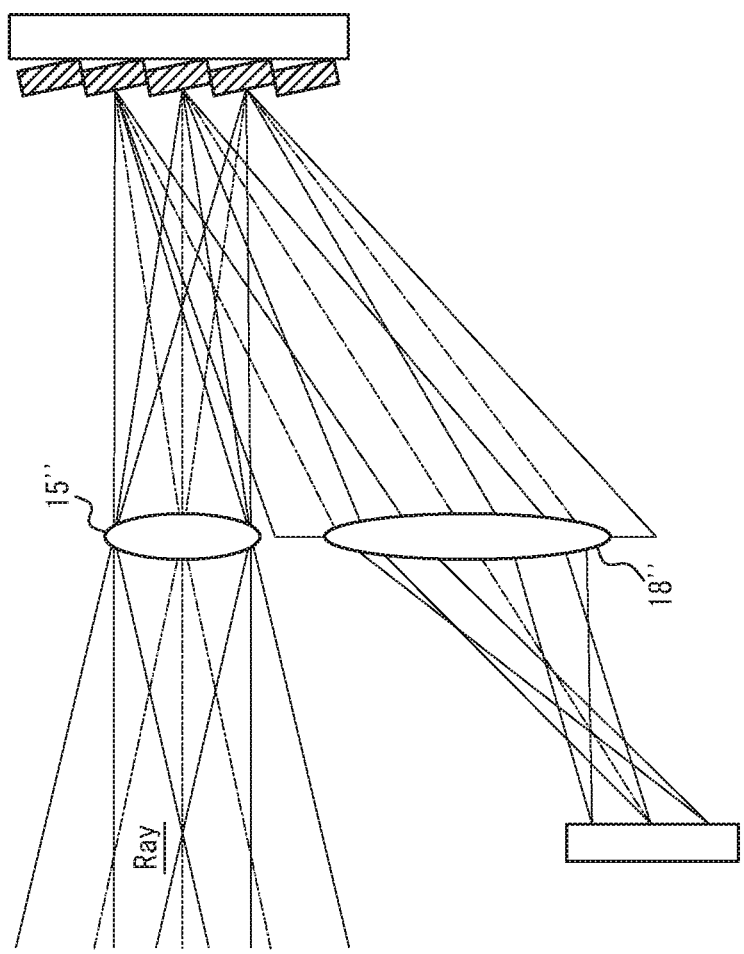
FIG. 2 illustrates the configuration of an electromagnetic wave detection apparatus to cause electromagnetic waves propagated in a propagation direction by a first propagation unit to enter a secondary imaging optical system while avoiding interference between a primary imaging optical system and the secondary imaging optical system.

Embodiments of an electromagnetic wave detection apparatus to which the present disclosure is applied are described below with reference to the drawings. An electromagnetic wave detection apparatus may include a primary imaging optical system that forms an image from incident electromagnetic waves, a propagation unit that can propagate electromagnetic waves propagated from the primary imaging optical system and incident on a reference surface in a direction different from the incident direction at each pixel, a secondary imaging optical system that forms an image on a detector from the electromagnetic waves formed as an image on the reference surface by the propagation unit, and the detector. This electromagnetic wave detection apparatus can detect the electromagnetic waves formed as a secondary image in the detector. The propagation unit, however, does not refract the incident electromagnetic waves like a relay lens. The image formed on the reference surface from the electromagnetic waves therefore propagates in the propagation direction while expanding. Consequently, for the electromagnetic waves incident on the propagation unit to be incident on the secondary imaging optical system without leakage, it becomes necessary to use a large secondary imaging optical system 18', as illustrated in FIG. 1. This makes an overall reduction in apparatus size difficult. Furthermore, in a configuration using a DMD in the propagation unit, use of the large secondary imaging optical system 18' may lead to interference with a primary imaging optical system 15', and actual production may become difficult. The reason is that the switching angle of a DMD is relatively small, yielding a small angle as well between the direction from the primary imaging optical system 15' towards the DMD and the direction in which the DMD propagates electromagnetic waves. As illustrated in FIG. 2, a reduction of the back flange length of a primary imaging optical system 15" and a reduction in size of a secondary imaging optical system 18" can avoid interference between the primary imaging optical system 15" and the secondary imaging optical system 18" and reduce apparatus size. Vignetting may occur, however, in the electromagnetic waves reflected by a portion of the pixels, and the intensity of the secondary image may become uneven. To address this issue, the electromagnetic wave detection apparatus to which the present disclosure is applied can reduce the probability of vignetting in a portion of the pixels without use of the large secondary imaging optical system 18" by reflecting, in another direction, electromagnetic waves propagated by the propagation unit in a different direction than the incident direction.

Figure 3:
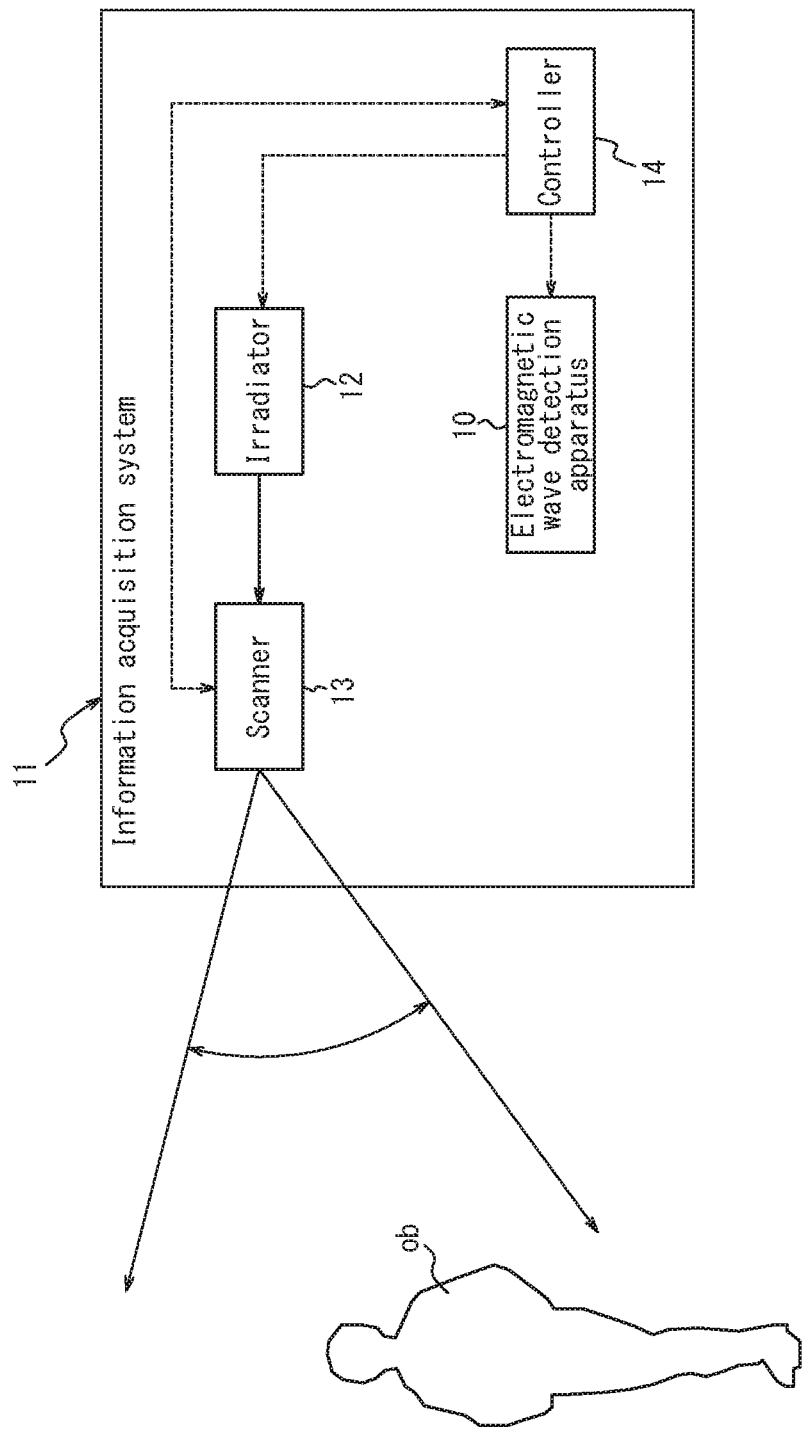
FIG. 3 is a configuration diagram schematically illustrating an information acquisition system that includes an electromagnetic wave detection apparatus according to a first embodiment.

As illustrated in FIG. 3, an information acquisition system 11 that includes an electromagnetic wave detection apparatus 10 according to a first embodiment of the present disclosure is configured to include the electromagnetic wave detection apparatus 10, an irradiator 12, a scanner 13, and a controller 14.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

Figure 4:
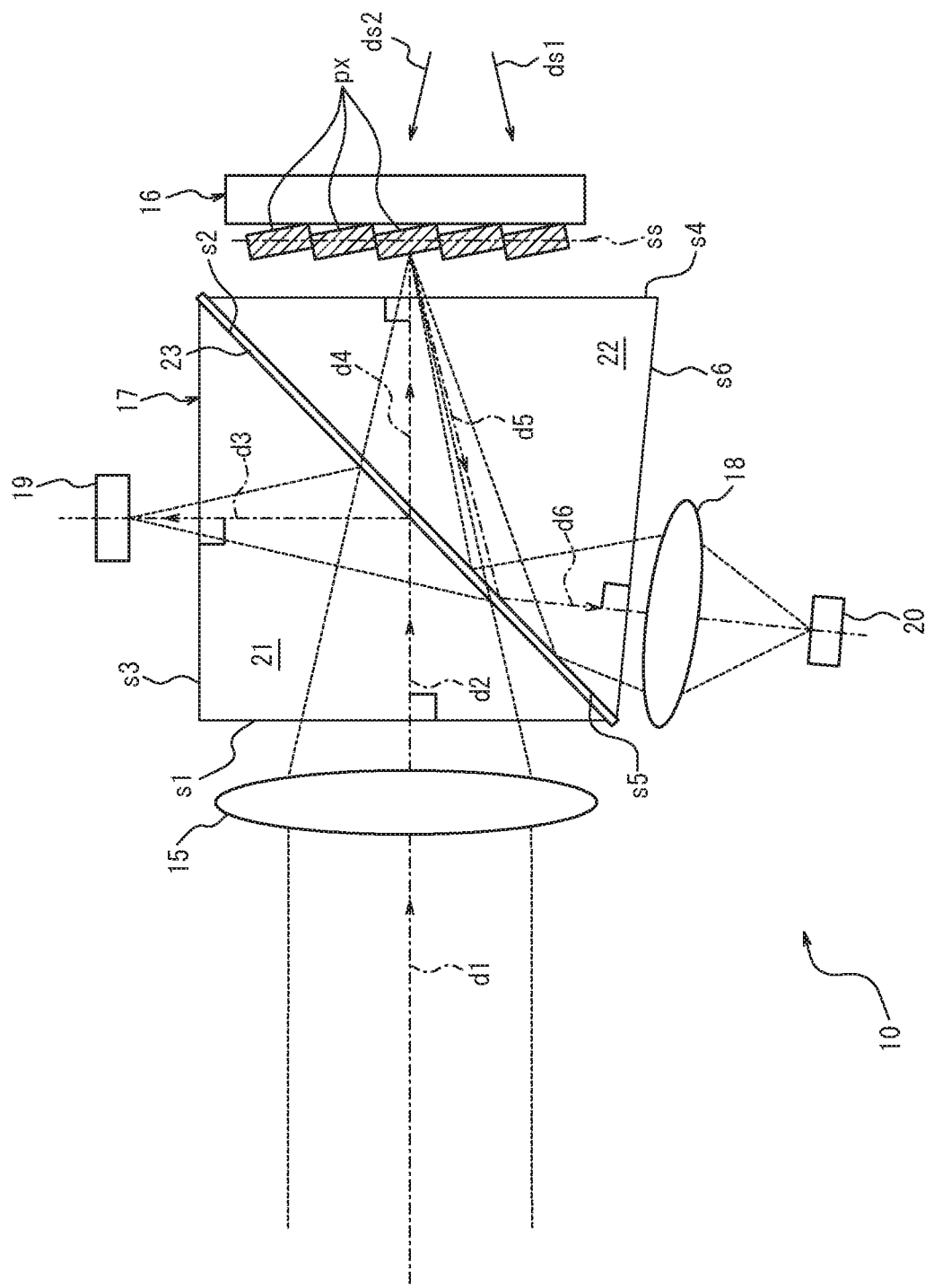
FIG. 4 is a configuration diagram schematically illustrating the electromagnetic wave detection apparatus of FIG. 3.

As illustrated in FIG. 4, the electromagnetic wave detection apparatus 10 includes a first imaging unit 15, a first propagation unit 16, a second propagation unit 17, a second imaging unit 18, a first detector 19, and a second detector 20.

The first imaging unit 15 includes at least one of a lens and a mirror, for example. The first imaging unit 15 propagates electromagnetic waves from an object ob that is the subject of imaging towards a first surface s1 of a second propagation unit 17 to form an image of the object ob at a position separated from the first surface s1. The electromagnetic waves are incident from a first direction d1 in the electromagnetic wave detection apparatus 10. For example, the first direction d1 is parallel to the main axis of the first imaging unit 15 and includes a direction from the object surface towards the first imaging unit 15 and a direction from the first imaging unit 15 towards the imaging plane.

The first propagation unit 16 is provided on the path of electromagnetic waves incident on the first surface s1 of the second propagation unit 17 and emitted from a fourth surface s4. Furthermore, the first propagation unit 16 may be provided at or near a primary image formation position of the object ob separated from the first imaging unit 15 by a predetermined distance.

In the first embodiment, the first propagation unit 16 is provided at the primary image formation position. The first propagation unit 16 has a reference surface ss on which electromagnetic waves that pass through the first imaging unit 15 and the second propagation unit 17 are incident. The reference surface ss is formed by a plurality of pixels px aligned in two dimensions. The reference surface ss is a surface that, in at least one of the first state and the second state described below, produces effects on the electromagnetic waves such as reflection and transmission. The first propagation unit 16 may form the image of electromagnetic waves of the object ob from the first imaging unit 15 on the reference surface ss. The reference surface ss may be perpendicular to the propagation axis of electromagnetic waves emitted from the fourth surface s4.

The first propagation unit 16 propagates the electromagnetic waves incident on the reference surface ss in a particular direction. The first propagation unit 16 can switch each pixel px between a first state of propagating electromagnetic waves in a first selected direction ds1 as the particular direction and a second state of propagating electromagnetic waves in a second selected direction ds2 as another particular direction. In the first embodiment, the first state includes a first reflecting state of reflecting the electromagnetic waves incident on the reference surface ss in the first direction d1. The second state includes a second reflecting state of reflecting the electromagnetic waves incident on the reference surface ss in a second direction d2.

In greater detail, the first propagation unit 16 of the first embodiment may include a reflecting surface that reflects the electromagnetic waves on each pixel px. The first propagation unit 16 may switch each pixel px between the first reflecting state and the second reflecting state by changing the orientation of the reflecting surface of each pixel px.

The first propagation unit 16 of the first embodiment may include a Digital Micro mirror Device (DMD), for example. The DMD can drive minute reflecting surfaces that configure the reference surface ss to switch the reflecting surface on each pixel px between inclined states of +12 degrees and −12 degrees relative to the reference surface ss. The reference surface ss may be parallel to the board surface of a substrate on which the minute reflecting surfaces are mounted in the DMD.

The first propagation unit 16 may switch each pixel px between the first state and the second state in response to control by the controller 14, described below. For example, the first propagation unit 16 can propagate electromagnetic waves incident on a portion of pixels px in the first selected direction ds1 by switching simultaneously the pixels px to the first state and propagate electromagnetic waves incident on another portion of pixels px in the second selected direction ds2 by switching the pixels px to the second state.

The second propagation unit 17 is provided between the first imaging unit 15 and the first propagation unit 16. The second propagation unit 17 separates the electromagnetic waves propagated from the first imaging unit 15 and emits the electromagnetic waves towards the first detector 19 and the first propagation unit 16. The second propagation unit 17 emits the electromagnetic waves whose propagation direction was changed by the first propagation unit 16 towards the second detector 20. The structure of the second propagation unit 17 is described in detail below.

The second propagation unit 17 includes at least the first surface s1, a second surface s2, a third surface s3, the fourth surface s4, a fifth surface s5, and a sixth surface s6.

The first surface s1 propagates the electromagnetic waves incident on the second propagation unit 17 from the first direction d1 in the second direction d2. The first surface s1 may be perpendicular to the propagation axis of the electromagnetic waves incident on the first surface s1 from the first direction d1. As described above, the first direction d1 is parallel to the main axis of the first imaging unit 15. The main axis of the first imaging unit 15 and the first surface s1 may therefore be perpendicular, i.e. the main surface of the first imaging unit 15 and the first surface s1 may be parallel. The first surface s1 may transmit or refract the electromagnetic waves incident from the first direction d1 in the second direction d2.

The second surface s2 separates the electromagnetic waves propagating from the first surface s1 in the second direction d2 and propagates the electromagnetic waves in a third direction d3 and a fourth direction d4. Among the electromagnetic waves propagated in the second direction d2, the second surface s2 may propagate electromagnetic waves of a particular wavelength in the third direction d3 and propagate electromagnetic waves of other wavelengths in the fourth direction d4. Among the electromagnetic waves propagated in the second direction d2, the second surface s2 may reflect electromagnetic waves of a particular wavelength in the third direction d3 and transmit or refract electromagnetic waves of other wavelengths in the fourth direction d4. Among the electromagnetic waves propagated in the second direction d2, the second surface s2 may subject electromagnetic waves of a particular wavelength to total reflection and propagate the electromagnetic waves in the third direction d3 and may transmit or refract electromagnetic waves of other wavelengths in the fourth direction d4. The angle of incidence on the second surface s2 of the electromagnetic waves propagated in the second direction d2 may be less than the critical angle.

The third surface s3 emits, from the second propagation unit 17, the electromagnetic waves propagated in the third direction d3 from the second surface s2. The third surface s3 may be perpendicular to the propagation axis of the electromagnetic waves propagated in the third direction d3 from the second surface s2, i.e. the third surface s3 may be perpendicular to the third direction d3.

The fourth surface s4 emits the electromagnetic waves propagated in the fourth direction d4 from the second surface s2 towards the reference surface ss of the first propagation unit 16. The fourth surface s4 also propagates the electromagnetic waves incident again from the reference surface ss of the first propagation unit 16 in a fifth direction d5. The fourth surface s4 may be perpendicular to the propagation axis of the electromagnetic waves propagated in the fourth direction d4 from the second surface s2, i.e. the fourth surface s4 may be perpendicular to the fourth direction d4. The fourth surface s4 may be parallel to the reference surface ss of the first propagation unit 16. The fourth surface s4 may transmit or refract the electromagnetic waves incident again from the reference surface ss in the fifth direction d5.

The fifth surface s5 propagates the electromagnetic waves propagated in the fifth direction d5 from the fourth surface s4 in a sixth direction d6. The fifth surface s5 may subject the electromagnetic waves propagated in the fifth direction d5 from the fourth surface s4 to internal reflection and propagate the electromagnetic waves in the sixth direction d6. The fifth surface s5 may subject the electromagnetic waves propagated in the fifth direction d5 from the fourth surface s4 to total internal reflection and propagate the electromagnetic waves in the sixth direction d6. The angle of incidence on the fifth surface s5 of the electromagnetic waves propagated in the fifth direction d5 from the fourth surface s4 may be equal to or greater than the critical angle. The angle of incidence on the fifth surface s5 of the electromagnetic waves propagated in the fifth direction d5 from the fourth surface s4 may be different from the angle of incidence on the second surface s2 of the electromagnetic waves propagated in the second direction d2 from the first surface s1. The angle of incidence on the fifth surface s5 of the electromagnetic waves propagated in the fifth direction d5 from the fourth surface s4 may be larger than the angle of incidence on the second surface s2 of the electromagnetic waves propagated in the second direction d2 from the first surface s1. The fifth surface s5 may be parallel to the second surface s2.

The sixth surface s6 emits the electromagnetic waves propagated in the sixth direction d6 from the fifth surface s5. The sixth surface s6 may be perpendicular to the propagation axis of the electromagnetic waves propagated from the fifth surface s5 in the sixth direction d6, i.e. the sixth surface s6 may be perpendicular to the sixth direction d6.

The first surface s1 through the sixth surface s6 in the first embodiment are described below along with details on the configuration of the second propagation unit 17.

The second propagation unit 17 in the first embodiment includes a first prism 21, a second prism 22, and a first intermediate layer 23.

The first prism 21 may include the first surface s1, the second surface s2, and the third surface s3 as different surfaces. The first prism 21 may include a triangular prism, for example, and the first surface s1, the second surface s2, and the third surface s3 may intersect each other.

The first prism 21 may be arranged so that the propagation axis of electromagnetic waves incident on the first surface s1 from the first direction d1 is perpendicular to the first surface s1. The first prism 21 may be arranged so that the second surface s2 is positioned in the second direction d2 of propagation through the first prism 21 after transmission or refraction at the first surface s1 from the first direction d1. The first prism 21 may be arranged so that the third surface s3 is positioned in the third direction d3 in which electromagnetic waves reflected at the second surface s2 propagate.

The second prism 22 may include the fourth surface s4, the fifth surface s5, and the sixth surface s6 as different surfaces. The second prism 22 may include a triangular prism, for example, and the fourth surface s4, the fifth surface s5, and the sixth surface s6 may intersect each other. The refractive index of the second prism 22 may be larger than the refractive index of the first prism 21.

The second prism 22 may be arranged so that the fifth surface s5 is parallel to and facing the second surface s2 of the first prism 21. The second prism 22 may be arranged so that the fourth surface s4 is positioned in the propagation direction of electromagnetic waves that are transmitted by the second surface s2 of the first prism 21 and propagate into the second prism 22 via the fifth surface s5. The second prism 22 may be arranged so that the sixth surface s6 is positioned in the sixth direction d6, which is an angle of reflection equal to the angle of incidence of electromagnetic waves from the fifth direction d5 at the fifth surface s5.

The first intermediate layer 23 may be arranged between the first prism 21 and the second prism 22. Furthermore, the first intermediate layer 23 may be in contact with the second surface s2 of the first prism 21 and include the second surface s2 along the interface with the first prism 21. The first intermediate layer 23 may be in contact with the fifth surface s5 of the second prism 22 and include the fifth surface s5 along the interface with the second prism 22. The first intermediate layer 23 may, for example, include a visible light reflective coating, a one-way mirror, a beam splitter, a dichroic mirror, a cold mirror, a hot mirror, a metasurface, or a deflection element attached to the second surface s2.

The refractive index of the first intermediate layer 23 may be smaller than the refractive index of the second prism 22. Accordingly, the electromagnetic waves that propagate inside the second prism 22 and are incident at an angle of incidence equal to or greater than the critical angle undergo total internal reflection at the fifth surface s5. The fifth surface s5 therefore subjects the electromagnetic waves propagating inside the second prism 22, with the fifth direction d5 as a propagation axis, to internal reflection. In a configuration such that the angle of incidence of the electromagnetic waves from the fifth direction d5 is equal to or greater than the critical angle, the fifth surface s5 subjects the electromagnetic waves propagating internally in the fifth direction d5 to total internal reflection and propagates the electromagnetic waves in the sixth direction d6.

The second imaging unit 18 may be provided on the path of electromagnetic waves that propagate in the sixth direction d6 from the second propagation unit 17 and exit from the sixth surface s6. The second imaging unit 18 may be provided so that the main surface is parallel to the sixth surface s6.

The second imaging unit 18 includes at least one of a lens and a mirror, for example. The electromagnetic waves that form a primary image on the reference surface ss of the first propagation unit 16 and are emitted from the sixth surface s6 is propagated towards the second detector 20 by the second imaging unit 18. The second imaging unit 18 forms an image of the object ob on the second detector 20.

The first detector 19 detects the electromagnetic waves emitted from the third surface s3. To detect the electromagnetic waves emitted from the third surface s3, the first detector 19 may be provided on the path of electromagnetic waves propagating in the third direction d3 from the second propagation unit 17. Furthermore, the first detector 19 may be provided in the third direction d3 from the second propagation unit 17 at or near the image formation position of the object ob by the first imaging unit 15.

Accordingly, the image of electromagnetic waves of the object ob that arrive via the second surface s2 and the third surface s3 may be formed on the detection surface of the first detector 19. The difference between the length of the propagation path of the electromagnetic waves propagated in the third direction d3 from the second surface s2 to the first detector 19 and the length of the propagation path of the electromagnetic waves propagated in the fourth direction d4 from the second surface s2 to the reference surface ss may therefore be a predetermined value or less and may also be equal.

The first detector 19 may be disposed so that the detection surface is parallel to the third surface s3. As described above, the third surface s3 can be perpendicular to the propagation axis of the electromagnetic waves that propagate in the third direction d3 and exit. The detection surface of the first detector 19 may be perpendicular to the propagation axis of the electromagnetic waves that exit from the third surface s3.

In the first embodiment, the first detector 19 includes a passive sensor. In greater detail, the first detector 19 in the first embodiment includes a device array. For example, the first detector 19 may include an imaging device such as an image sensor or an imaging array, capture the image formed from electromagnetic waves at a detection surface, and generate image information corresponding to the imaged object ob.

In greater detail, the first detector 19 in the first embodiment may capture a visible light image. The first detector 19 may transmit the generated image information to the controller 14 as a signal.

The first detector 19 may capture an image other than a visible light image, such as an image of infrared light, ultraviolet light, and radio waves. The first detector 19 may include a ranging sensor. In this configuration, the electromagnetic wave detection apparatus 10 can acquire distance information in image form with the first detector 19. The first detector 19 may include a ranging sensor, a thermosensor, or the like. In this configuration, the electromagnetic wave detection apparatus 10 can acquire temperature information in image form with the first detector 19.

The second detector 20 detects the electromagnetic waves that are emitted from the sixth surface s6 and pass through the second imaging unit 18. To detect the electromagnetic waves emitted from the sixth surface s6, the second detector 20 may be disposed on the path of propagation of electromagnetic waves that propagate in the sixth direction d6 from the second propagation unit 17, are emitted from the sixth surface s6, and pass through the second imaging unit 18. The second detector 20 may be disposed at or near a secondary image formation position where the second imaging unit 18 forms an image from the image of electromagnetic waves formed on the reference surface ss of the first propagation unit 16.

The second detector 20 may be disposed so that the detection surface is parallel to the sixth surface s6. As described above, the sixth surface s6 can be perpendicular to the propagation axis of the electromagnetic waves that propagate in the sixth direction d6 and exit. The detection surface of the second detector 20 may be perpendicular to the propagation axis of the electromagnetic waves that exit from the sixth surface s6. The detection surface of the second detector 20 may be parallel to the main surface of the second imaging unit 18.

In the first embodiment, the second detector 20 may be an active sensor that detects reflected waves resulting from reflection, by the object ob, of electromagnetic waves emitted towards the object ob from the irradiator 12. The second detector 20 in the first embodiment may detect reflected waves resulting from reflection, by the object ob, of electromagnetic waves emitted towards the object ob after being emitted from the irradiator 12 and reflected by the scanner 13. As described below, the electromagnetic waves emitted from the irradiator 12 can be at least one of infrared rays, visible light rays, ultraviolet rays, and radio waves. The second detector 20 is a different type or the same type of sensor as the first detector 19 and detects either a different type or the same type of electromagnetic waves.

In greater detail, the second detector 20 of the first embodiment includes a device configured as a ranging sensor. For example, the second detector 20 includes a single device such as an Avalanche PhotoDiode (APD), a Photo-Diode (PD), a Single Photon Avalanche Diode (SPAD), a millimeter wave sensor, a sub-millimeter wave sensor, or a ranging image sensor. The second detector 20 may include a device array, such as an APD array, a PD array, a Multi Photon Pixel Counter (MPPC), a ranging imaging array, or a ranging image sensor.

The second detector 20 of the first embodiment transmits detection information, indicating the detection of reflected waves from the subject, to the controller 14 as a signal. In greater detail, the second detector 20 is an infrared sensor that detects electromagnetic waves in the infrared light band.

It suffices for the single device configured as the above-described ranging sensor in second detector 20 to be capable of detecting electromagnetic waves. Image formation at the detection surface is not required. Therefore, the second detector 20 is not necessarily provided at or near the secondary image formation position, which is the position at which the second imaging unit 18 forms an image. In other words, as long as electromagnetic waves from all angles of view can be incident on the detection surface, the second detector 20 in this configuration may be disposed at any position along the path of electromagnetic waves that are emitted from the sixth surface s6 of the second propagation unit 17 and subsequently pass through the second imaging unit 18 and propagate.

In FIG. 3, the irradiator 12 may emit at least one of infrared rays, visible light rays, ultraviolet rays, and radio waves, for example. In the first embodiment, the irradiator 12 emits infrared rays. The irradiator 12 may emit the electromagnetic waves towards the object ob either indirectly via the scanner 13 or directly. In the first embodiment, the irradiator 12 may emit the electromagnetic waves towards the object ob indirectly via the scanner 13.

In the first embodiment, the irradiator 12 may emit a narrow beam, for example 0.5 degrees, of electromagnetic waves. In the first embodiment, the irradiator 12 may emit pulses of electromagnetic waves. For example, the irradiator 12 includes a light emitting diode (LED), a laser diode (LD), or the like. The irradiator 12 may switch between emitting and not emitting electromagnetic waves based on control by the controller 14, described below.

The scanner 13 may include a reflecting surface that reflects electromagnetic waves, for example, and may change the irradiation position of electromagnetic waves irradiated onto the object ob by reflecting the electromagnetic waves emitted from the irradiator 12 while changing orientation. In other words, the scanner 13 may scan the object ob using the electromagnetic waves emitted from the irradiator 12. Accordingly, the second detector 20 in the first embodiment may work together with the scanner 13 to form a scanning-type ranging sensor. The scanner 13 may scan the object ob one- or two-dimensionally. In the first embodiment, the scanner 13 scans the object ob two-dimensionally.

The scanner 13 may be configured so that at least a portion of an irradiation region of the electromagnetic waves that are emitted by the irradiator 12 and reflected is included in an electromagnetic wave detection range of the electromagnetic wave detection apparatus 10. Accordingly, at least a portion of the electromagnetic waves emitted onto the object ob via the scanner 13 can be detected by the electromagnetic wave detection apparatus 10.

In the first embodiment, the scanner 13 is configured so that at least a portion of the irradiation region of the electromagnetic waves that are emitted by the irradiator 12 and reflected by the scanner 13 is included in the detection range of the second detector 20. Accordingly, in the first embodiment, at least a portion of the electromagnetic waves emitted onto the object ob via the scanner 13 can be detected by the second detector 20.

The scanner 13 may, for example, include a micro electro mechanical systems (MEMS) mirror, a polygon mirror, a galvano mirror, or the like. In the first embodiment, the scanner 13 includes a MEMS mirror.

Based on control by the controller 14, described below, the scanner 13 may change the direction in which electromagnetic waves are reflected. The scanner 13 may include an angle sensor, such as an encoder, and may notify the controller 14 of the angle detected by the angle sensor as information on the direction in which electromagnetic waves are reflected (direction information). This configuration allows the controller 14 to calculate the irradiation position based on the direction information acquired from the scanner 13. The controller 14 can also calculate the irradiation position based on a drive signal inputted to the scanner 13 to change the direction in which electromagnetic waves are reflected.

The controller 14 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 14 may include either or both of a system-on-a-chip (SoC) that has one processor or a plurality of processors working together and a system-in-a-package (SiP).

The controller 14 may acquire information related to the surroundings of the electromagnetic wave detection apparatus 10 based on electromagnetic waves detected by each of the first detector 19 and the second detector 20. The information related to the surroundings may, for example, be image information, distance information, and temperature information. In the first embodiment, the controller 14 acquires image information in the form of electromagnetic waves detected as an image by the first detector 19, as described above. Based on the detection information detected by the second detector 20, the controller 14 in the first embodiment also uses the time-of-flight (ToF) method to acquire distance information of the irradiation position irradiated by the irradiator 12, as described below.

Figure 5:
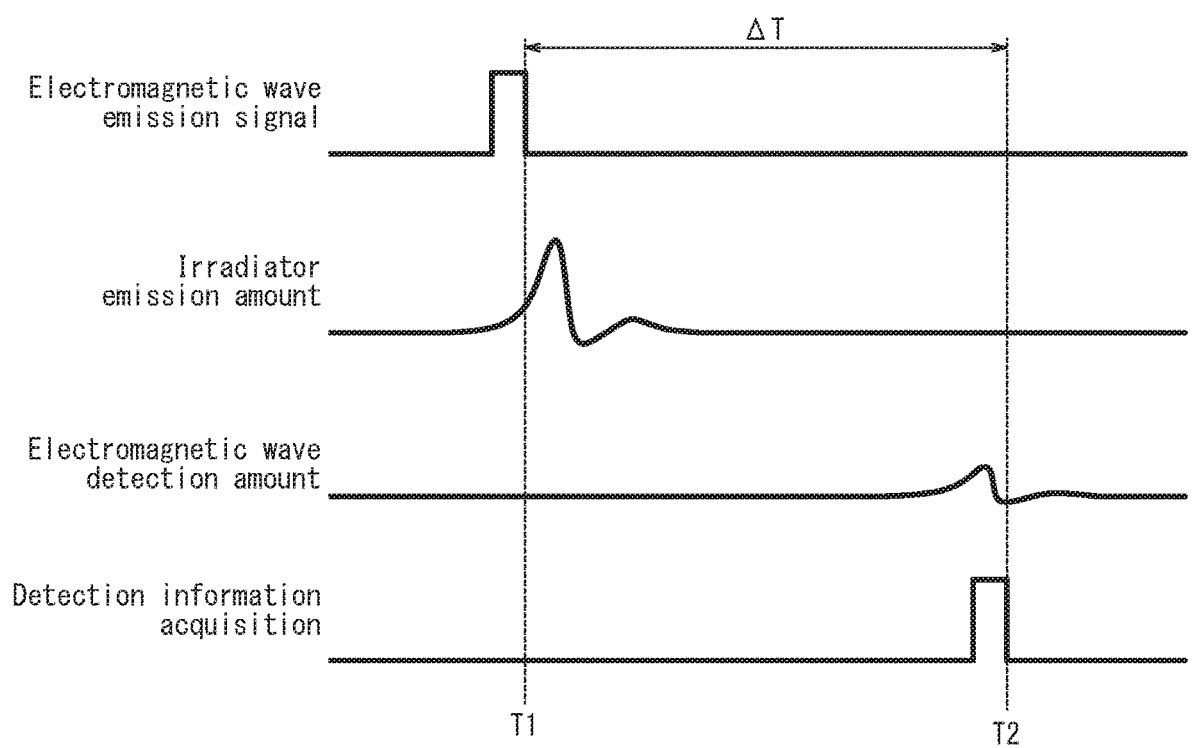
FIG. 5 is a timing chart of the timing of emission and detection of electromagnetic waves to illustrate the principle of ranging by a ranging sensor configured by an irradiator, a second detector, and a controller of FIG. 3.

As illustrated in FIG. 5, the controller 14 causes the irradiator 12 to emit pulses of electromagnetic waves by inputting an electromagnetic wave emission signal to the irradiator 12 (see the "electromagnetic wave emission signal" section). The irradiator 12 emits electromagnetic waves based on the inputted electromagnetic wave emission signal (see the "irradiator emission amount" section). The electromagnetic waves emitted by the irradiator 12 and reflected by the scanner 13 to be irradiated on an arbitrary irradiation region are reflected in the irradiation region. The controller 14 switches at least a portion of the pixels px, in an image formation region in the first propagation unit 16 where reflected waves in the irradiation region are formed into an image by the first imaging unit 15, to the first state and switches the other pixels px to the second state. The second detector 20 then notifies the controller 14 of detection information, as described above, when detecting electromagnetic waves reflected in the irradiation region (see the "electromagnetic wave detection amount" section).

The controller 14 may, for example, include a time measurement large scale integrated circuit (LSI) and measure a time $\Delta T$ from a timing T1 at which the controller 14 caused the irradiator 12 to emit electromagnetic waves to a timing T2 at which the controller 14 acquires the detection information (see the "detection information acquisition" section). The controller 14 multiplies the time $\Delta T$ by the speed of light and divides by two to calculate the distance to the irradiation position. As described above, the controller 14 calculates the irradiation position based on the direction information acquired from the scanner 13 or the drive signal that the controller 14 outputs to the scanner 13. By changing the irradiation position while calculating the distance to each irradiation position, the controller 14 creates distance information in image form.

In the first embodiment, the information acquisition system 11 is configured to create distance information by direct ToF, in which the time from when electromagnetic waves are emitted until the electromagnetic waves return is directly measured, as described above. The information acquisition system 11 is not, however, limited to this configuration. For example, the information acquisition system 11 may create distance information by flash ToF, in which electromagnetic waves are emitted with a constant period, and the time until return is measured indirectly from the phase difference between the emitted electromagnetic waves and the returning electromagnetic waves. The information acquisition system 11 may also create distance information by another ToF method, such as phased ToF.

In the electromagnetic wave detection apparatus 10 of the first embodiment with the above configuration, the second propagation unit 17 includes the fourth surface s4 and the fifth surface s5. The fourth surface s4 emits the electromagnetic waves propagated in the fourth direction d4 towards the reference surface ss and propagates electromagnetic waves incident again from the reference surface ss in the fifth direction d5. The fifth surface s5 propagates the electromagnetic waves propagated in the fifth direction d5 in the sixth direction d6. The electromagnetic wave detection apparatus 10 configured in this way further propagates electromagnetic waves propagated in a particular direction by the reference surface ss in a different direction, thereby enabling the second imaging unit 18 to be disposed without interfering with the first imaging unit 15. Furthermore, the electromagnetic wave detection apparatus 10 configured in this way enables the second imaging unit 18 to be disposed outside of the path of electromagnetic waves from the first imaging unit 15 to the first propagation unit 16. The distance from the first imaging unit 15 to the reference surface ss and the distance in the propagation path of electromagnetic waves from the reference surface ss to the second imaging unit 18 can therefore be shortened. The electromagnetic wave detection apparatus 10 can thereby enable electromagnetic waves, formed as a primary image on the reference surface ss and changed in propagation direction, to be incident on the second imaging unit 18 before expanding greatly while propagating. Accordingly, the electromagnetic wave detection apparatus 10 can reduce the occurrence of vignetting even when the second imaging unit 18 is reduced in size. The electromagnetic wave detection apparatus 10 consequently does not become large overall, and the intensity of electromagnetic waves of the secondary image formed by the second imaging unit 18 can be made uniform. The effects of such a configuration are the same for the electromagnetic wave detection apparatus of the second through the eighth embodiments, described below.

The electromagnetic wave detection apparatus 10 of the first embodiment separates electromagnetic waves incident from the first imaging unit 15 so that the electromagnetic waves propagate in the third direction d3 and the fourth direction d4. The electromagnetic wave detection apparatus 10 with this configuration can match the main axis of the first imaging unit 15 to the propagation axis of the electromagnetic waves propagated in the third direction d3 and to the propagation axis of the electromagnetic waves propagated in the fourth direction d4. Accordingly, the electromagnetic wave detection apparatus 10 can reduce the misalignment of the coordinate systems of the first detector 19 and the second detector 20. The effects of such a configuration are the same for the electromagnetic wave detection apparatus of the second through the eighth embodiments, described below.

In the information acquisition system 11 of the first embodiment, the controller 14 acquires information related to the surroundings of the electromagnetic wave detection apparatus 10 based on the electromagnetic waves detected by each of the first detector 19 and the second detector 20. The information acquisition system 11 with this configuration can provide useful information based on detected electromagnetic waves. The effects of such a configuration are the same for the electromagnetic wave detection apparatus of the second through the eighth embodiments, described below.

Next, an electromagnetic wave detection apparatus according to the second embodiment of the present disclosure is described. In the second embodiment, the configuration of the second propagation unit differs from the first embodiment. The second embodiment is described below, focusing on the differences from the first embodiment. The same reference signs are used for components with the same configuration as in the first embodiment.

Figure 6:
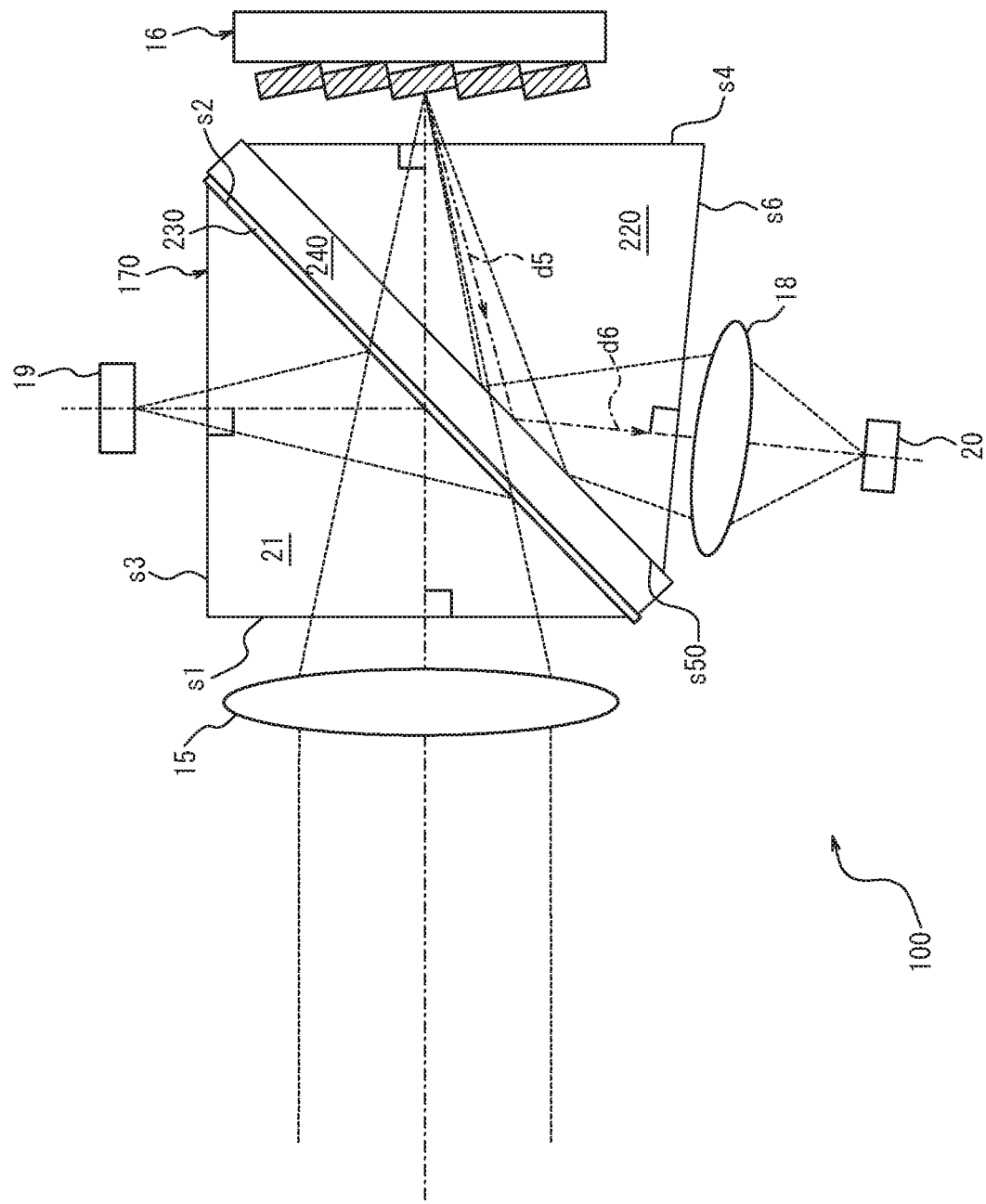
FIG. 6 is a configuration diagram schematically illustrating an electromagnetic wave detection apparatus according to a second embodiment.

As illustrated in FIG. 6, an electromagnetic wave detection apparatus 100 according to the second embodiment includes a first imaging unit 15, a first propagation unit 16, a second propagation unit 170, a second imaging unit 18, a first detector 19, and a second detector 20. Other than the electromagnetic wave detection apparatus 100, the configuration and functions of an information acquisition system 11 according to the second embodiment are the same as in the first embodiment. The configuration and functions other than the second propagation unit 170 in the second embodiment are the same as in the first embodiment.

In the second embodiment, the second propagation unit 170 includes at least a first surface s1, a second surface s2, a third surface s3, a fourth surface s4, a fifth surface s5, and a sixth surface s6, like the first embodiment. In the second embodiment, the configuration and the functions of the first surface s1, the second surface s2, the third surface s3, the fourth surface s4, and the sixth surface s6 are the same as in the first embodiment. In the second embodiment, the configuration and the functions of a fifth surface s50 other than the object in contact with the fifth surface s50 are the same as in the first embodiment.

The second propagation unit 170 in the second embodiment includes a total internal reflection prism and includes a first prism 21, a second prism 220, a first intermediate layer 230, and a second intermediate layer 240. The configuration and functions of the first prism 21 are the same as in the first embodiment. The actual structure of the second prism 220, the arrangement thereof relative to the first prism 21, and the functions thereof are the same as in the first embodiment.

As in the first embodiment, the first intermediate layer 230 may be arranged between the first prism 21 and the second prism 220. Furthermore, as in the first embodiment, the first intermediate layer 230 may be in contact with the second surface s2 of the first prism 21 and include the second surface s2 along the interface with the first prism 21. As in the first embodiment, the first intermediate layer 230 may, for example, include a visible light reflective coating, a one-way mirror, a beam splitter, a dichroic mirror, a cold mirror, a hot mirror, a metasurface, or a deflection element attached to the second surface s2.

The second intermediate layer 240 may be arranged between the fifth surface s50 of the second prism 220 and the first intermediate layer 230. The second intermediate layer 240 may be in contact with the fifth surface s50 of the second prism 220 and may include the fifth surface s50 along the interface with the second prism 220. The second intermediate layer 240 may be in contact with the opposite surface of the first intermediate layer 230 from the surface in contact with the first prism 21.

Figure 7:
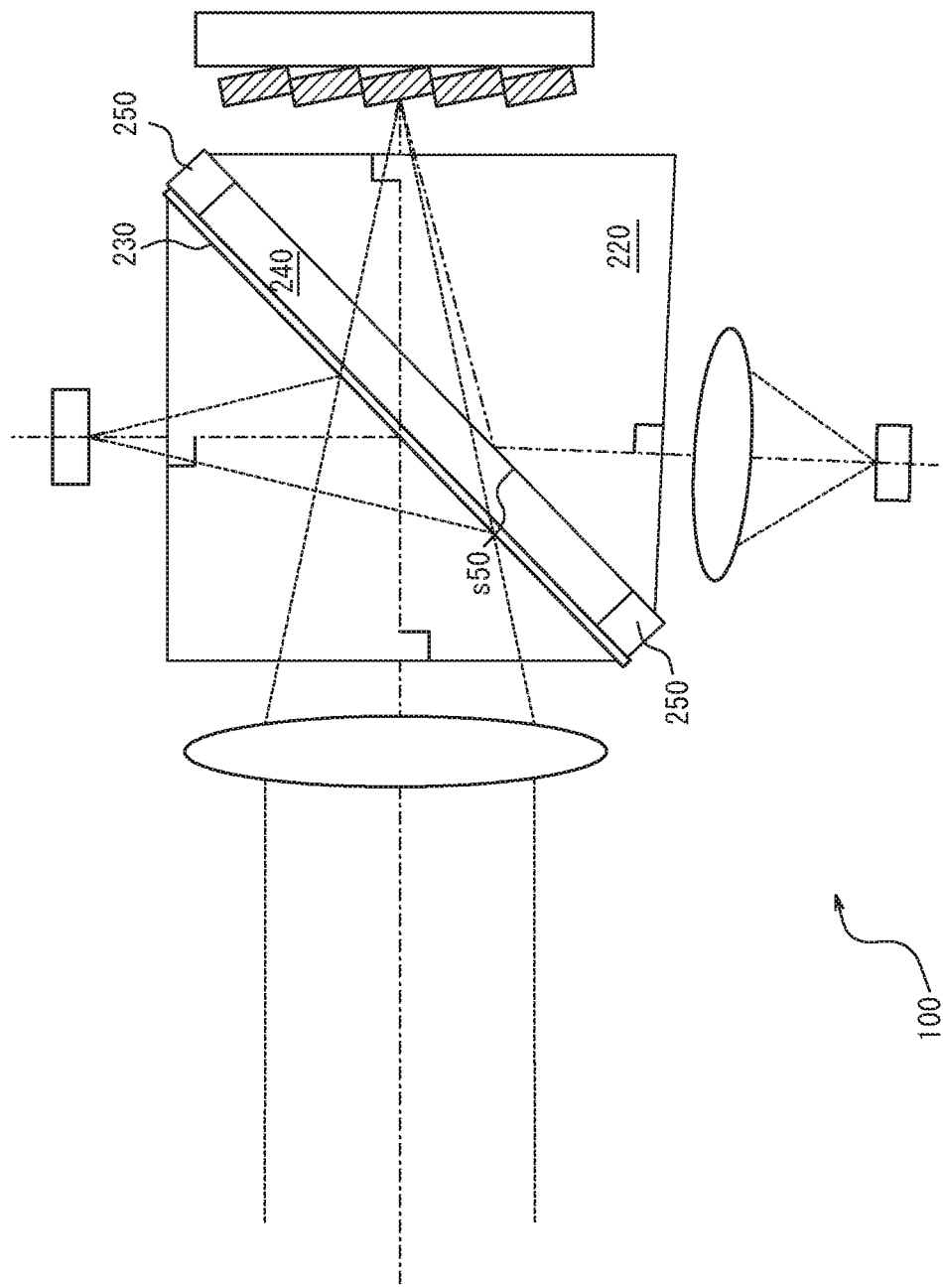
FIG. 7 is a configuration diagram schematically illustrating a modification to the electromagnetic wave detection apparatus according to the second embodiment.

The second intermediate layer 240 may have a refractive index smaller than the refractive index of the second prism 220 and is, for example, a vacuum or includes at least one of a gas, liquid, or solid with a smaller refractive index than the second prism 220. Accordingly, the electromagnetic waves that propagate inside the second prism 220 and are incident at an angle of incidence equal to or greater than the critical angle undergo total internal reflection at the fifth surface s50. The fifth surface s50 therefore subjects the electromagnetic waves propagating inside the second prism 220, with the fifth direction d5 as a propagation axis, to internal reflection. In a configuration such that the angle of incidence of the electromagnetic waves from the fifth direction d5 is equal to or greater than the critical angle, the fifth surface s50 subjects the electromagnetic waves propagating internally in the fifth direction d5 to total internal reflection and propagates the electromagnetic waves in the sixth direction d6. In a configuration in which the second intermediate layer 240 is a gas or liquid, spacers 250 may be provided at the outer edges of the first intermediate layer 230 and the fifth surface s50 of the second prism 220, as illustrated in FIG. 7, and the second intermediate layer 240 may be formed by filling the inside with gas or liquid. The second intermediate layer 240 in the second embodiment may include an air layer or a prism, for example.

In the electromagnetic wave detection apparatus 100 of the second embodiment with the above configuration, the fifth surface s50 includes the interface between the second intermediate layer 240 and the second prism 220. This electromagnetic wave detection apparatus 100 can be configured so that the function to separate the electromagnetic waves incident on the second surface s2 is achieved in the first intermediate layer 230. This electromagnetic wave detection apparatus 100 can be configured so that the effect of causing the electromagnetic waves propagated in the fifth direction d5 to propagate in the sixth direction d6 is achieved in the second intermediate layer 240. Accordingly, the electromagnetic wave detection apparatus 100 can increase the degree of freedom for selecting the material to use as the first intermediate layer 230.

Next, an electromagnetic wave detection apparatus according to the third embodiment of the present disclosure is described. In the third embodiment, the configuration of the second propagation unit differs from the first embodiment. The third embodiment is described below, focusing on the differences from the first embodiment. The same reference signs are used for components with the same configuration as in the first or second embodiment.

Figure 8:
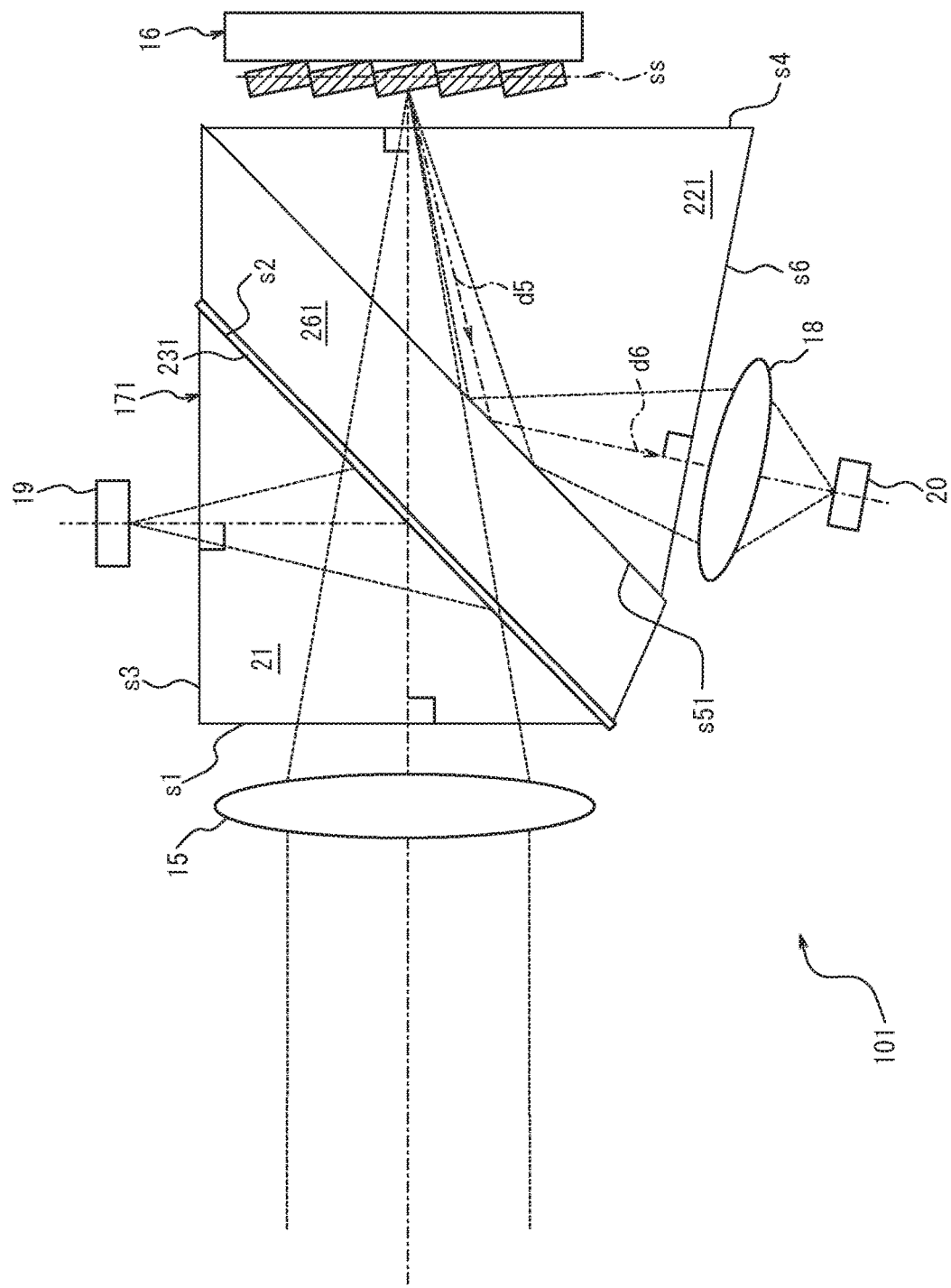
FIG. 8 is a configuration diagram schematically illustrating an electromagnetic wave detection apparatus according to a third embodiment.

As illustrated in FIG. 8, an electromagnetic wave detection apparatus 101 according to the third embodiment includes a first imaging unit 15, a first propagation unit 16, a second propagation unit 171, a second imaging unit 18, a first detector 19, and a second detector 20. Other than the electromagnetic wave detection apparatus 101, the configuration and functions of an information acquisition system 11 according to the third embodiment are the same as in the first embodiment. The configuration and functions other than the second propagation unit 171 in the third embodiment are the same as in the first embodiment.

In the third embodiment, the second propagation unit 171 includes at least a first surface s1, a second surface s2, a third surface s3, a fourth surface s4, a fifth surface s51, and a sixth surface s6, like the first embodiment. In the third embodiment, the configuration and the functions of the first surface s1, the second surface s2, the third surface s3, the fourth surface s4, and the sixth surface s6 are the same as in the first embodiment. In the third embodiment, the configuration and the functions of the fifth surface s51 other than the object in contact with the fifth surface s51 are the same as in the first embodiment.

The second propagation unit 171 in the third embodiment includes a first prism 21, a second prism 221, a third prism 261, and a first intermediate layer 231. The configuration and functions of the first prism 21 are the same as in the first embodiment. The actual structure of the second prism 221, the arrangement thereof relative to the first prism 21, and the functions thereof are the same as in the first embodiment.

The third prism 261 may be arranged between the first intermediate layer 231 and the second prism 221. The refractive index of the third prism 261 may be smaller than that of the second prism 221. Accordingly, the electromagnetic waves that propagate inside the second prism 221 and are incident at an angle of incidence equal to or greater than the critical angle undergo total internal reflection at the fifth surface s51. The fifth surface s51 therefore subjects the electromagnetic waves propagating inside the second prism 221, with the fifth direction d5 as a propagation axis, to internal reflection. In a configuration such that the angle of incidence of the electromagnetic waves from the fifth direction d5 is equal to or greater than the critical angle, the fifth surface s51 subjects the electromagnetic waves propagating internally in the fifth direction d5 to total internal reflection and propagates the electromagnetic waves in the sixth direction d6.

The third prism 261 may be plate shaped, and one flat surface may be in contact with the first intermediate layer 231. The other flat surface of the third prism 261 may be in contact with the fifth surface s51 of the second prism 221 and may include the fifth surface s51 along the interface with the second prism 221.

Unlike the first embodiment, the first intermediate layer 231 may be arranged between the first prism 21 and the third prism 261. Furthermore, as in the first embodiment, the first intermediate layer 231 may be in contact with the second surface s2 of the first prism 21 and include the second surface s2 along the interface with the first prism 21. As in the first embodiment, the first intermediate layer 231 may, for example, include a visible light reflective coating, a one-way mirror, a beam splitter, a dichroic mirror, a cold mirror, a hot mirror, a metasurface, or a deflection element attached to the second surface s2.

In the electromagnetic wave detection apparatus 101 of the third embodiment with the above configuration, the second propagation unit 171 includes the third prism 261. The third prism 261 is disposed between the first prism 21 and the first intermediate layer 231, and the fifth surface s51 includes the interface between the second prism 221 and the third prism 261. To reduce interference by the first detector 19 with the first prism 21, the second surface s2 is preferably disposed close to the first imaging unit 15. Furthermore, to reduce the second imaging unit 18 in size, the propagation path of electromagnetic waves that propagate in the order of the fifth surface s51, the fourth surface s4, the reference surface ss, the fourth surface s4, the fifth surface s51, and the sixth surface s6 is preferably shortened, and the fifth surface s51 is preferably disposed near the reference surface ss of the first propagation unit 16. Accordingly, the electromagnetic wave detection apparatus 101 with the above configuration enables the second surface s2 and the fifth surface s51 to be separated, thereby enabling the fifth surface s51 to be brought closer to the reference surface ss while bringing the second surface s2 closer to the first imaging unit 15 side. Consequently, the electromagnetic wave detection apparatus 101 can reduce the second imaging unit 18 in size while reducing interference by the first detector 19 with the first prism 21. The effects of such a configuration are the same for the electromagnetic wave detection apparatus of the fourth through the eighth embodiments, described below.

Next, an electromagnetic wave detection apparatus according to the fourth embodiment of the present disclosure is described. In the fourth embodiment, the configuration of the second propagation unit differs from the first embodiment. The fourth embodiment is described below, focusing on the differences from the first embodiment. The same reference signs are used for components with the same configuration as in the first, second, or third embodiment.

Figure 9:
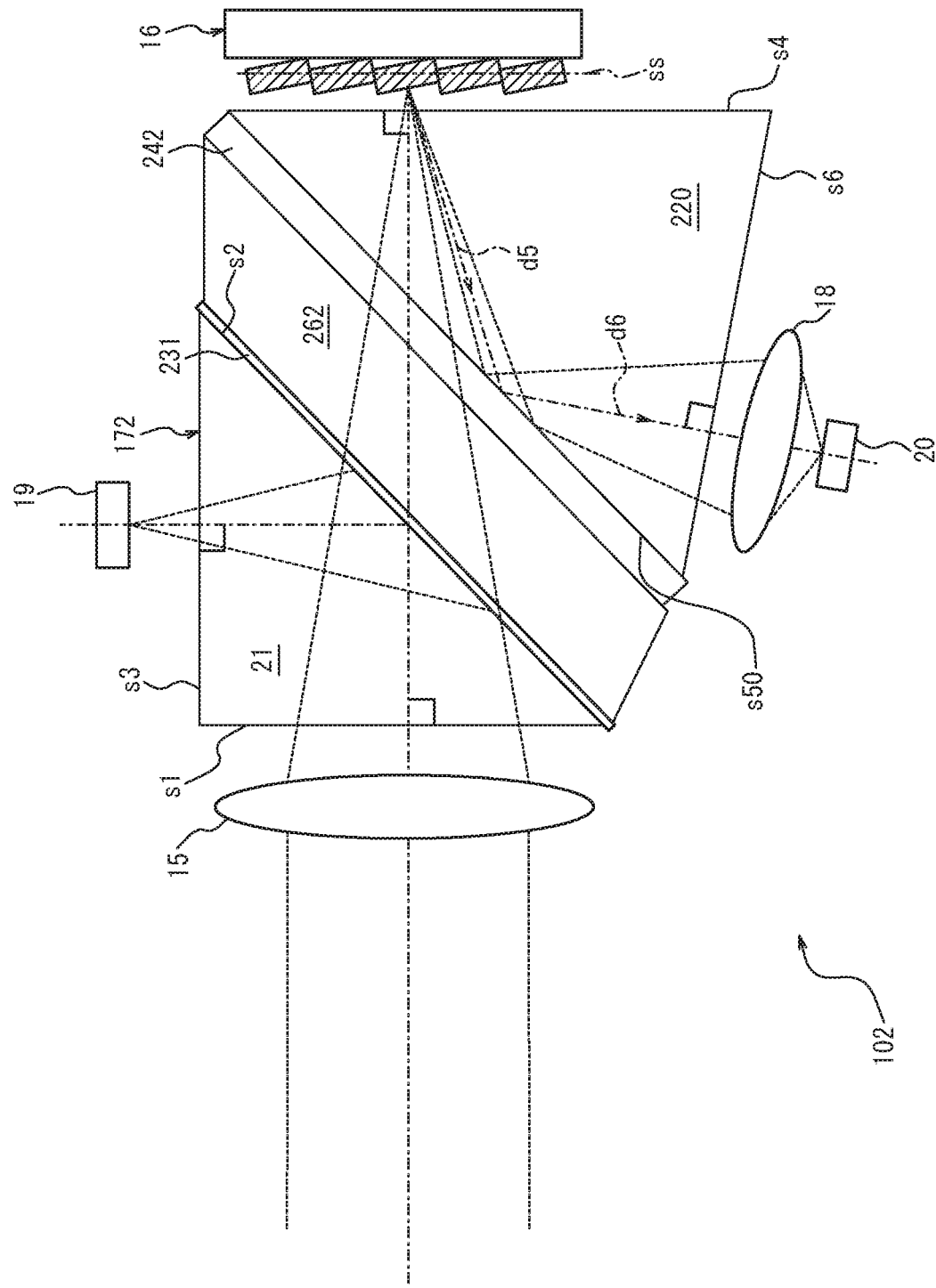
FIG. 9 is a configuration diagram schematically illustrating an electromagnetic wave detection apparatus according to a fourth embodiment.

As illustrated in FIG. 9, an electromagnetic wave detection apparatus 102 according to the fourth embodiment includes a first imaging unit 15, a first propagation unit 16, a second propagation unit 172, a second imaging unit 18, a first detector 19, and a second detector 20. Other than the electromagnetic wave detection apparatus 102, the configuration and functions of an information acquisition system 11 according to the fourth embodiment are the same as in the first embodiment. The configuration and functions other than the second propagation unit 172 in the fourth embodiment are the same as in the first embodiment.

In the fourth embodiment, the second propagation unit 172 includes at least a first surface s1, a second surface s2, a third surface s3, a fourth surface s4, a fifth surface s52, and a sixth surface s6, like the first embodiment. In the fourth embodiment, the configuration and the functions of the first surface s1, the second surface s2, the third surface s3, the fourth surface s4, and the sixth surface s6 are the same as in the first embodiment. In the fourth embodiment, the configuration and the functions of the fifth surface s52 other than the object in contact with the fifth surface s52 are the same as in the first embodiment.

The second propagation unit 172 in the fourth embodiment includes a total internal reflection prism, for example, and includes a first prism 21, a second prism 220, a third prism 262, a first intermediate layer 231, and a second intermediate layer 242. The configuration and functions of the first prism 21 and the first intermediate layer 231 are the same as in the third embodiment. The configuration and functions of the second prism 220 are the same as in the second embodiment. The actual structure of the third prism 262, the arrangement thereof relative to the first prism 21, and the functions thereof are the same as in the first embodiment. Accordingly, the first intermediate layer 231 may be arranged between the first prism 21 and the second intermediate layer 242. Furthermore, the first intermediate layer 231 may include the second surface s2 along the interface with the first prism 21.

The second intermediate layer 242 may be arranged between the second prism 220 and the third prism 262. As in the second embodiment, the second intermediate layer 242 may be in contact with the fifth surface s50 of the second prism 220 and may include the fifth surface s50 along the interface with the second prism 220. The second intermediate layer 242 may be in contact with the opposite surface of the third prism 262 from the flat surface in contact with the first intermediate layer 231.

Figure 10:
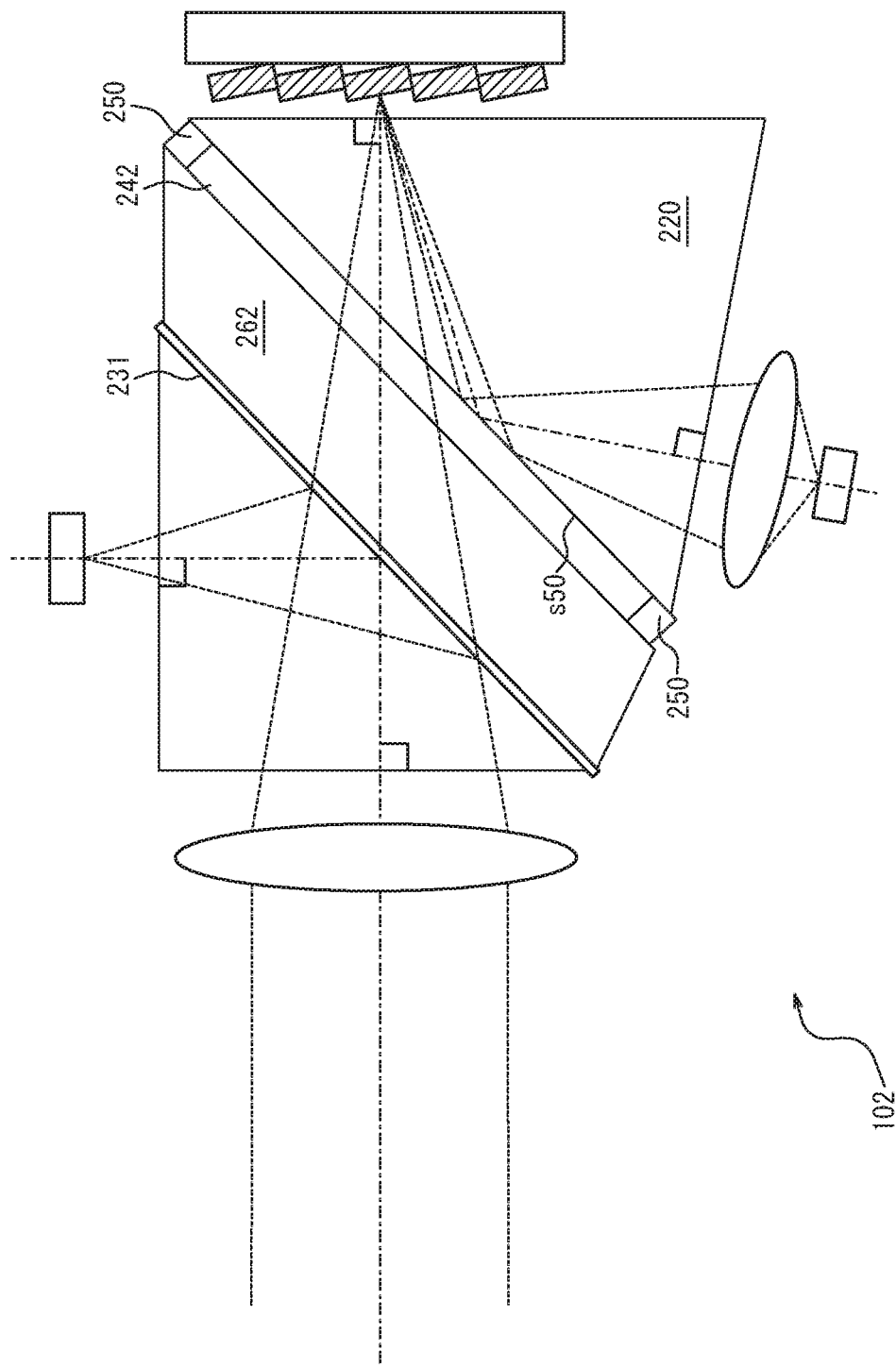
FIG. 10 is a configuration diagram schematically illustrating a modification to the electromagnetic wave detection apparatus according to the fourth embodiment.

As in the second embodiment, the second intermediate layer 242 has a refractive index smaller than the refractive index of the second prism 220 and is, for example, a vacuum or includes at least one of a gas, liquid, or solid with a smaller refractive index than the second prism 220. Accordingly, the electromagnetic waves that propagate inside the second prism 220 and are incident at an angle of incidence equal to or greater than the critical angle undergo total internal reflection at the fifth surface s50. The fifth surface s50 therefore subjects the electromagnetic waves propagating inside the second prism 220, with the fifth direction d5 as a propagation axis, to internal reflection. In a configuration such that the angle of incidence of the electromagnetic waves from the fifth direction d5 is equal to or greater than the critical angle, the fifth surface s50 subjects the electromagnetic waves propagating internally in the fifth direction d5 to total internal reflection and propagates the electromagnetic waves in the sixth direction d6. In a configuration in which the second intermediate layer 242 is a gas or liquid, spacers 250 may be provided at the outer edges of the third prism 262 and the fifth surface s50 of the second prism 220, as illustrated in FIG. 10, and the second intermediate layer 242 may be formed by filling the inside with gas or liquid. The second intermediate layer 242 in the fourth embodiment may include an air layer or a prism, for example.

Next, an electromagnetic wave detection apparatus according to the fifth embodiment of the present disclosure is described. In the fifth embodiment, the configuration of the second propagation unit differs from the first embodiment. The fifth embodiment is described below, focusing on the differences from the first embodiment. The same reference signs are used for components with the same configuration as in the first, second, third, or fourth embodiment.

Figure 11:
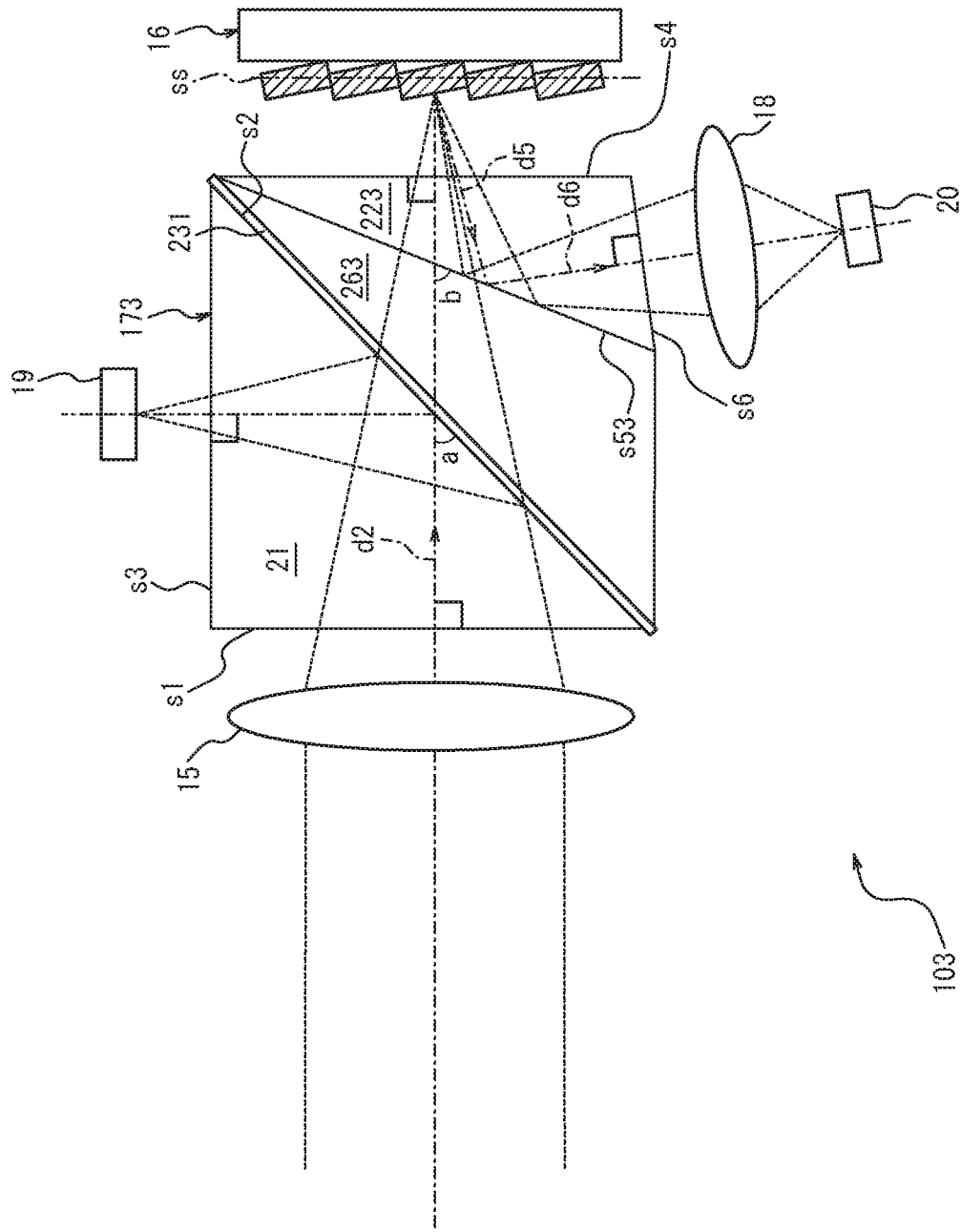
FIG. 11 is a configuration diagram schematically illustrating an electromagnetic wave detection apparatus according to a fifth embodiment.

As illustrated in FIG. 11, an electromagnetic wave detection apparatus 103 according to the fifth embodiment includes a first imaging unit 15, a first propagation unit 16, a second propagation unit 173, a second imaging unit 18, a first detector 19, and a second detector 20. Other than the electromagnetic wave detection apparatus 103, the configuration and functions of an information acquisition system 11 according to the fifth embodiment are the same as in the first embodiment. The configuration and functions other than the second propagation unit 173 in the fifth embodiment are the same as in the first embodiment.

In the fifth embodiment, the second propagation unit 173 includes at least a first surface s1, a second surface s2, a third surface s3, a fourth surface s4, a fifth surface s53, and a sixth surface s6, like the first embodiment. In the fifth embodiment, the configuration and the functions of the first surface s1, the second surface s2, the third surface s3, the fourth surface s4, and the sixth surface s6 are the same as in the first embodiment.

As in the first embodiment, the fifth surface s53 may propagate the electromagnetic waves propagated in the fifth direction d5 from the fourth surface s4 in the sixth direction d6. As in the first embodiment, the fifth surface s53 may subject the electromagnetic waves propagated in the fifth direction d5 from the fourth surface s4 to internal reflection and propagate the electromagnetic waves in the sixth direction d6. As in the first embodiment, the fifth surface s53 may subject the electromagnetic waves propagated in the fifth direction d5 from the fourth surface s4 to total internal reflection and propagate the electromagnetic waves in the sixth direction d6. The angle of incidence on the fifth surface s53 of the electromagnetic waves propagated in the fifth direction d5 from the fourth surface s4 may be equal to or greater than the critical angle, like the first embodiment.

Unlike the first embodiment, the angle of incidence on the fifth surface s53 of the electromagnetic waves propagated in the fifth direction d5 from the fourth surface s4 may be identical to or different from the angle of incidence on the second surface s2 of the electromagnetic waves propagated in the second direction d2 from the first surface s1. Unlike the first embodiment, the angle of incidence on the fifth surface s53 of the electromagnetic waves propagated in the fifth direction d5 from the fourth surface s4 may be larger or smaller than the angle of incidence on the second surface s2 of the electromagnetic waves propagated in the second direction d2 from the first surface s1. Unlike the first embodiment, the fifth surface s53 may be non-parallel to the second surface s2.

The second propagation unit 173 in the fifth embodiment may include a first prism 21, a second prism 223, a third prism 263, and a first intermediate layer 231. The configuration and functions of the first prism 21 and the first intermediate layer 231 are the same as in the third embodiment.

As in the first embodiment, the second prism 223 may include the fourth surface s4, the fifth surface s53, and the sixth surface s6 as different surfaces. As in the first embodiment, the second prism 223 may include a triangular prism, for example, and the fourth surface s4, the fifth surface s5, and the sixth surface s6 may intersect each other.

As in the first embodiment, the second prism 223 is arranged so that the fifth surface s53 faces the second surface s2 of the first prism 21. As in the first embodiment, the second prism 223 is arranged so that the fourth surface s4 is positioned in the propagation direction of electromagnetic waves that are transmitted by the second surface s2 of the first prism 21 and propagate into the second prism 223 via the fifth surface s53. As in the first embodiment, the second prism 223 is arranged so that the sixth surface s6 is positioned in the sixth direction d6, which is an angle of reflection equal to the angle of incidence of electromagnetic waves from the fifth direction d5 at the fifth surface s53.

Unlike the first embodiment, the second prism 223 may be arranged so that an angle b between the second direction d2 and the fifth surface s53 is larger than an angle a between the second direction d2 and the second surface s2.

For example, the second prism 223 may be arranged relative to the first prism 21 to have a shape such that the fifth surface s53 is rotated away from the first prism 21 about an axis at the intersection of the fourth surface s4 and the fifth surface s53, i.e. a shape such that the fifth surface s53 is rotated closer to the fourth surface s4.

As in the third embodiment, the third prism 263 is arranged between the first intermediate layer 231 and the second prism 223. As in the third embodiment, the refractive index of the third prism 263 is smaller than that of the second prism 223. Accordingly, the electromagnetic waves that propagate inside the second prism 223 and are incident at an angle of incidence equal to or greater than the critical angle undergo total internal reflection at the fifth surface s53, as in the third embodiment. The fifth surface s53 therefore subjects the electromagnetic waves propagating inside the second prism 223, with the fifth direction d5 as a propagation axis, to internal reflection, as in the third embodiment. In a configuration such that the angle of incidence of the electromagnetic waves from the fifth direction d5 is equal to or greater than the critical angle, the fifth surface s53 subjects the electromagnetic waves propagating internally in the fifth direction d5 to total internal reflection and propagates the electromagnetic waves in the sixth direction d6, as in the third embodiment.

Unlike the third embodiment, the third prism 263 in the fifth embodiment includes a triangular prism, for example. Similar to the third embodiment, one inclined face of the third prism 263 may be in contact with the first intermediate layer 231. Similar to the third embodiment, another inclined face of the third prism 263 may be in contact with the fifth surface s53 of the second prism 223 and may include the fifth surface s53 along the interface with the second prism 223.

In the electromagnetic wave detection apparatus 103 of the fifth embodiment with the above configuration, the angle of incidence of electromagnetic waves incident again on the fifth surface s53 from the reference surface ss via the fourth surface s4 is smaller than the angle of incidence on the second surface s2 of electromagnetic waves propagated in the second direction d2. This configuration of the electromagnetic wave detection apparatus 103 enables the second prism 223 to be arranged relative to the first prism 21 with a shape such that the fifth surface s53 is rotated away from the first prism 21 about an axis at the intersection of the fourth surface s4 and the fifth surface s53. Accordingly, the electromagnetic wave detection apparatus 103 can reduce the distance between the fifth surface s53 and the reference surface ss of the first propagation unit 16 that is disposed on the side of the second surface s2 by the third surface s3. Consequently, the electromagnetic wave detection apparatus 103 can shorten the propagation path of electromagnetic waves that propagate in the order of the fifth surface s53, the fourth surface s4, the reference surface ss, the fourth surface s4, the fifth surface s53, and the sixth surface s6, thus enabling a further reduction in size of the second imaging unit 18. The effects of such a configuration are the same for the electromagnetic wave detection apparatus of the sixth embodiment, described below.

Next, an electromagnetic wave detection apparatus according to the sixth embodiment of the present disclosure is described. In the sixth embodiment, the configuration of the second propagation unit differs from the first embodiment. The sixth embodiment is described below, focusing on the differences from the first embodiment. The same reference signs are used for components with the same configuration as in the first, second, third, fourth, or fifth embodiment.

Figure 12:
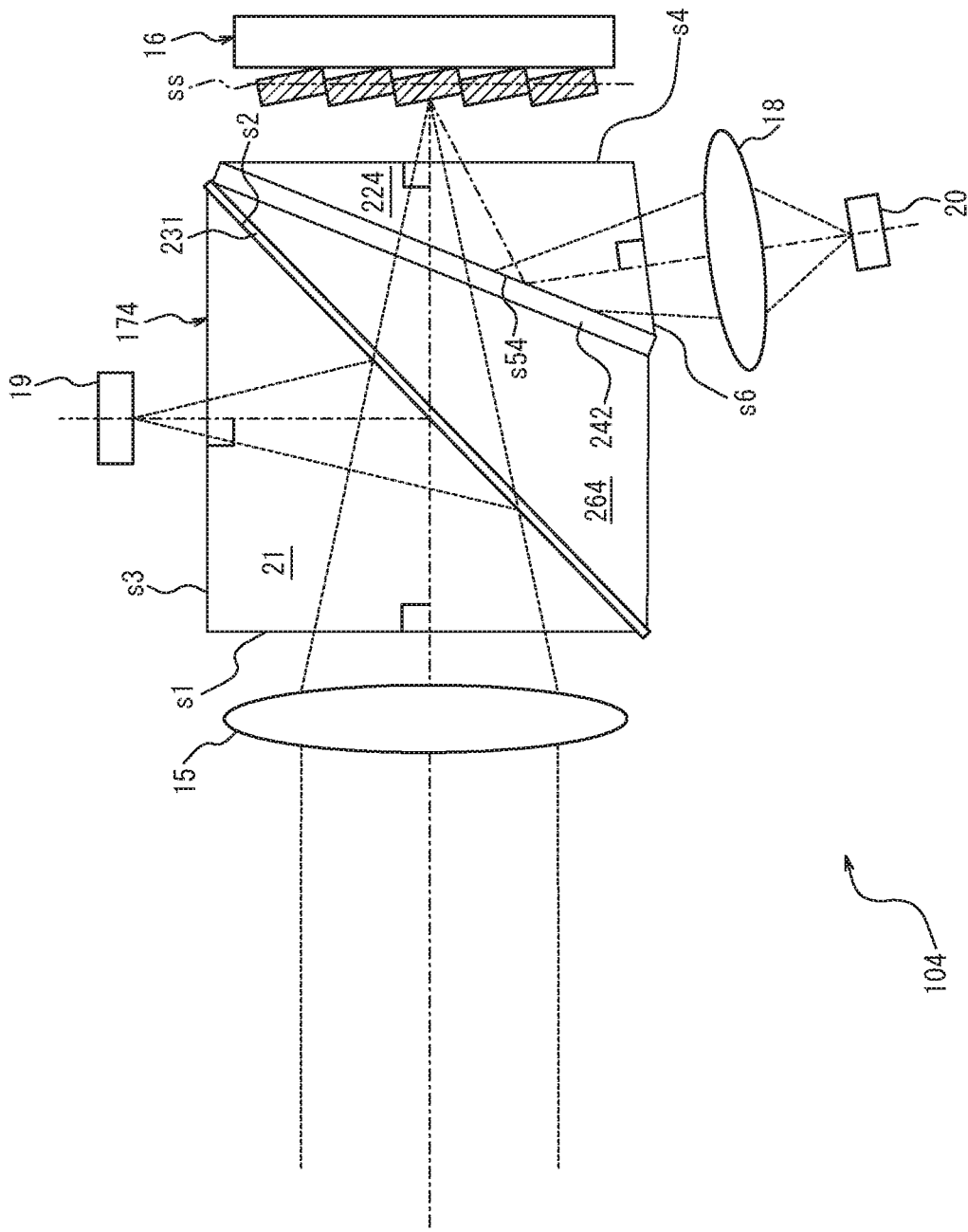
FIG. 12 is a configuration diagram schematically illustrating an electromagnetic wave detection apparatus according to a sixth embodiment.

As illustrated in FIG. 12, an electromagnetic wave detection apparatus 104 according to the sixth embodiment includes a first imaging unit 15, a first propagation unit 16, a second propagation unit 174, a second imaging unit 18, a first detector 19, and a second detector 20. Other than the electromagnetic wave detection apparatus 104, the configuration and functions of an information acquisition system 11 according to the sixth embodiment are the same as in the first embodiment. The configuration and functions other than the second propagation unit 174 in the sixth embodiment are the same as in the first embodiment.

In the sixth embodiment, the second propagation unit 174 includes at least a first surface s1, a second surface s2, a third surface s3, a fourth surface s4, a fifth surface s54, and a sixth surface s6, like the first embodiment. In the sixth embodiment, the configuration and the functions of the first surface s1, the second surface s2, the third surface s3, the fourth surface s4, and the sixth surface s6 are the same as in the first embodiment. In the sixth embodiment, the configuration and the functions of the fifth surface s54 other than the object in contact with the fifth surface s54 are the same as in the fifth embodiment.

The second propagation unit 174 in the sixth embodiment includes a total internal reflection prism and includes a first prism 21, a second prism 224, a third prism 264, a first intermediate layer 231, and a second intermediate layer 242. The configuration and functions of the first prism 21 and the first intermediate layer 231 are the same as in the third embodiment. The actual structure of the second prism 224 and the third prism 264, the arrangement thereof relative to the first prism 21, and the functions thereof are the same as in the fifth embodiment. Accordingly, the first intermediate layer 231 is arranged between the first prism 21 and the second intermediate layer 242. Furthermore, the first intermediate layer 231 may include the second surface s2 along the interface with the first prism 21.

Figure 13:
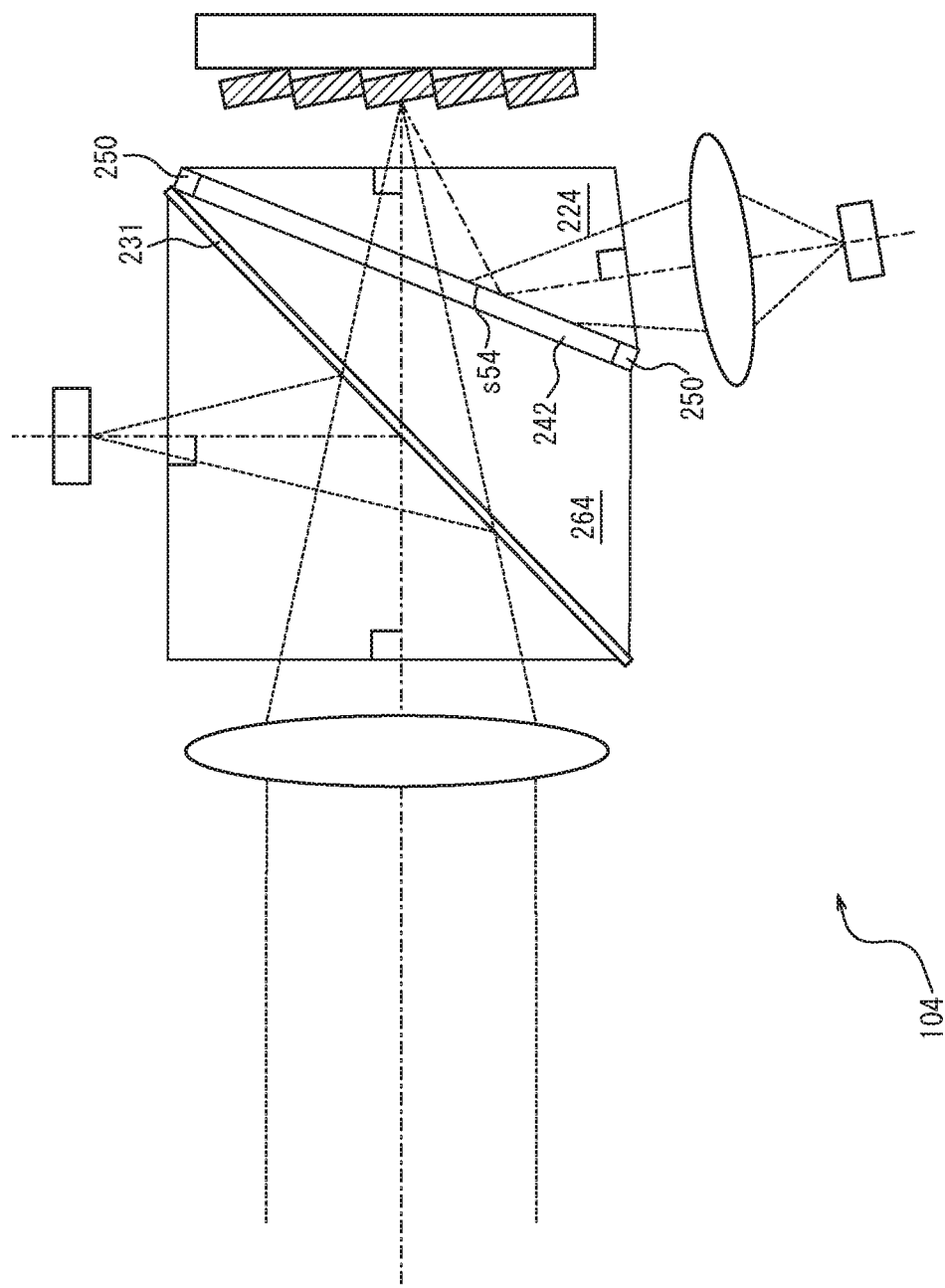
FIG. 13 is a configuration diagram schematically illustrating a modification to the electromagnetic wave detection apparatus according to the sixth embodiment.

In the sixth embodiment, the configuration and the functions of the second intermediate layer 242 are the same as in the fourth embodiment. Accordingly, as in the fourth embodiment, the second intermediate layer 242 has a refractive index smaller than the refractive index of the second prism 224 and is, for example, a vacuum or includes at least one of a gas, liquid, or solid with a smaller refractive index than the second prism 224. In a configuration in which the second intermediate layer 242 is a gas or liquid, spacers 250 may be provided at the outer edges of the third prism 264 and the fifth surface s54 of the second prism 224, as illustrated in FIG. 13, and the second intermediate layer 242 may be formed by filling the inside with gas or liquid. The second intermediate layer 242 in the sixth embodiment may include an air layer or a prism, for example.

Next, an electromagnetic wave detection apparatus according to the seventh embodiment of the present disclosure is described. In the seventh embodiment, the configuration of the second propagation unit differs from the first embodiment. The seventh embodiment is described below, focusing on the differences from the first embodiment. The same reference signs are used for components with the same configuration as in the first, second, third, fourth, fifth, or sixth embodiment.

Figure 14:
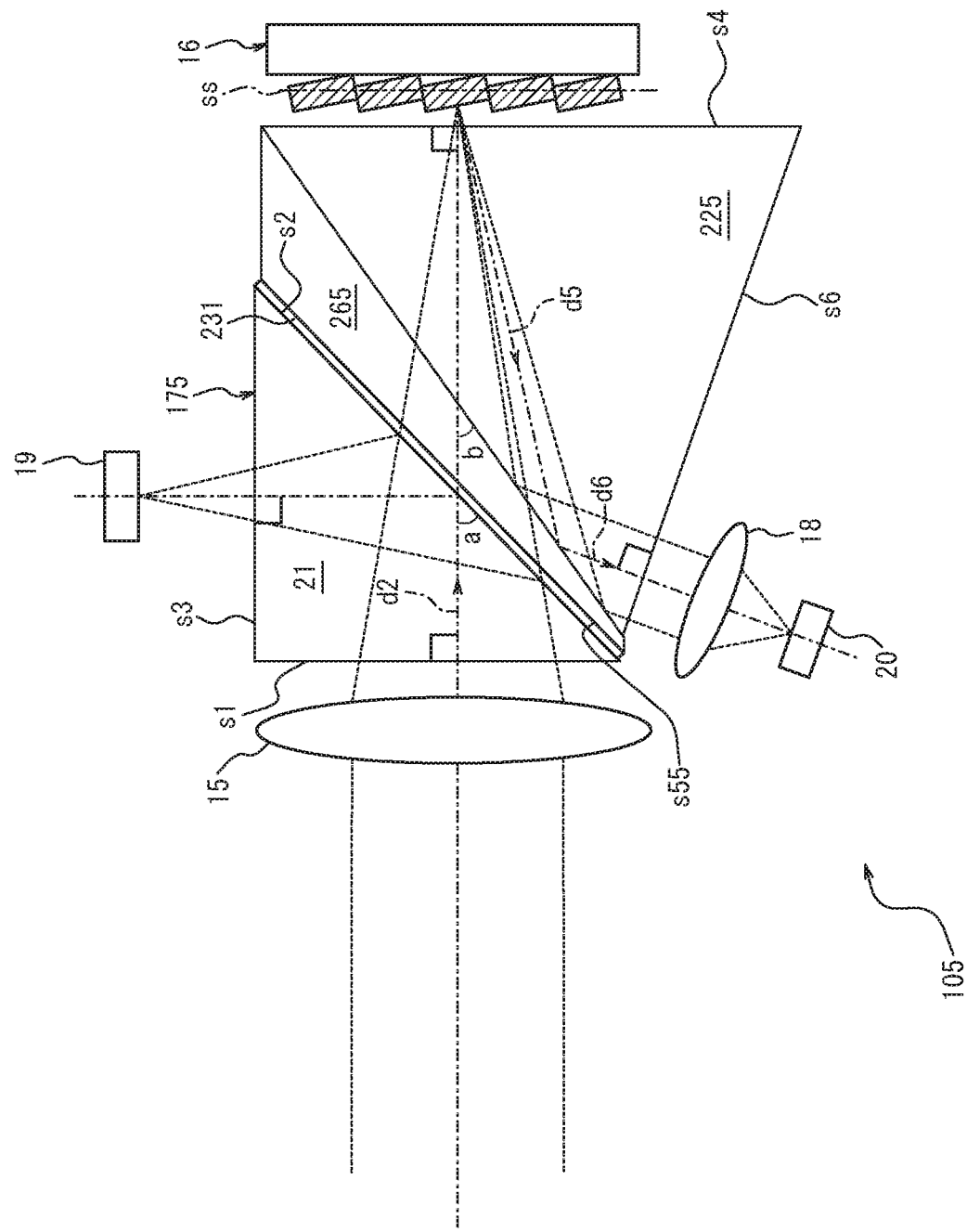
FIG. 14 is a configuration diagram schematically illustrating an electromagnetic wave detection apparatus according to a seventh embodiment.

As illustrated in FIG. 14, an electromagnetic wave detection apparatus 105 according to the seventh embodiment includes a first imaging unit 15, a first propagation unit 16, a second propagation unit 175, a second imaging unit 18, a first detector 19, and a second detector 20. Other than the electromagnetic wave detection apparatus 105, the configuration and functions of an information acquisition system 11 according to the seventh embodiment are the same as in the first embodiment. The configuration and functions other than the second propagation unit 175 in the seventh embodiment are the same as in the first embodiment.

In the seventh embodiment, the second propagation unit 175 includes at least a first surface s1, a second surface s2, a third surface s3, a fourth surface s4, a fifth surface s55, and a sixth surface s6, like the first embodiment. In the seventh embodiment, the configuration and the functions of the first surface s1, the second surface s2, the third surface s3, the fourth surface s4, and the sixth surface s6 are the same as in the first embodiment.

As in the first embodiment, the fifth surface s55 may propagate the electromagnetic waves propagated in the fifth direction d5 from the fourth surface s4 in the sixth direction d6. As in the first embodiment, the fifth surface s55 may subject the electromagnetic waves propagated in the fifth direction d5 from the fourth surface s4 to internal reflection and propagate the electromagnetic waves in the sixth direction d6. As in the first embodiment, the fifth surface s55 may subject the electromagnetic waves propagated in the fifth direction d5 from the fourth surface s4 to total internal reflection and propagate the electromagnetic waves in the sixth direction d6. The angle of incidence on the fifth surface s55 of the electromagnetic waves propagated in the fifth direction d5 from the fourth surface s4 may be equal to or greater than the critical angle, like the first embodiment. As in the first embodiment, the angle of incidence on the fifth surface s55 of the electromagnetic waves propagated in the fifth direction d5 from the fourth surface s4 may differ from the angle of incidence on the second surface s2 of the electromagnetic waves propagated in the second direction d2 from the first surface s1. As in the first embodiment, the angle of incidence on the fifth surface s55 of the electromagnetic waves propagated in the fifth direction d5 from the fourth surface s4 may be larger than the angle of incidence on the second surface s2 of the electromagnetic waves propagated in the second direction d2 from the first surface s1.

Unlike the first embodiment, the fifth surface s55 may be non-parallel to the second surface s2.

The second propagation unit 175 in the seventh embodiment includes a first prism 21, a second prism 225, a third prism 265, and a first intermediate layer 231. The configuration and functions of the first prism 21 and the first intermediate layer 231 are the same as in the third embodiment. The functions of the third prism 265 are similar to those of the fifth embodiment.

As in the first embodiment, the second prism 225 may include the fourth surface s4, the fifth surface s55, and the sixth surface s6 as different surfaces. As in the first embodiment, the second prism 225 may include a triangular prism, for example, and the fourth surface s4, the fifth surface s5, and the sixth surface s6 may intersect each other.

As in the first embodiment, the second prism 225 may be arranged so that the fifth surface s55 faces the second surface s2 of the first prism 21. As in the first embodiment, the second prism 225 may be arranged so that the fourth surface s4 is positioned in the propagation direction of electromagnetic waves that are transmitted by the second surface s2 of the first prism 21 and propagate into the second prism 225 via the fifth surface s55. As in the first embodiment, the second prism 225 may be arranged so that the sixth surface s6 is positioned in the sixth direction d6, which is an angle of reflection equal to the angle of incidence of electromagnetic waves from the fifth direction d5 at the fifth surface s55.

Unlike the first embodiment, the second prism 225 may be arranged so that an angle b between the second direction d2 and the fifth surface s55 is smaller than an angle a between the second direction d2 and the second surface s2.

For example, the second prism 225 may be arranged relative to the first prism 21 to have a shape such that the fifth surface s55 is rotated away from the first prism 21 about an axis at the intersection of the fifth surface s55 and the sixth surface s6, i.e. a shape such that the fifth surface s55 is rotated closer to the sixth surface s6.

In the electromagnetic wave detection apparatus 105 of the seventh embodiment with this configuration, the second prism 225 is arranged relative to the first prism 21 with a shape such that the fifth surface s55 is rotated away from the first prism 21 about an axis at the intersection of the fifth surface s55 and the sixth surface s6. The electromagnetic wave detection apparatus 105 with this configuration can further reduce the angle between the fifth surface s55 and the fifth direction d5, which is the propagation axis of the electromagnetic waves that propagate after being incident again on the fourth surface s4 from the reference surface ss. Accordingly, the electromagnetic wave detection apparatus 105 increases the angle of incidence on the fifth surface s55 of the electromagnetic waves propagating in the fifth direction d5. Among the emitted bundle of electromagnetic waves propagating in the fifth direction d5, the component that is reflected rather than transmitted by the fifth surface s55 can therefore be increased. The electromagnetic wave detection apparatus 105 can consequently increase detection sensitivity, since a large component of the electromagnetic waves is incident on the second detector 20. The effects of such a configuration are the same for the electromagnetic wave detection apparatus of the eighth embodiment, described below.

Next, an electromagnetic wave detection apparatus according to the eighth embodiment of the present disclosure is described. In the eighth embodiment, the configuration of the second propagation unit differs from the first embodiment. The eighth embodiment is described below, focusing on the differences from the first embodiment. The same reference signs are used for components with the same configuration as in the first, second, third, fourth, fifth, sixth, or seventh embodiment.

Figure 15:
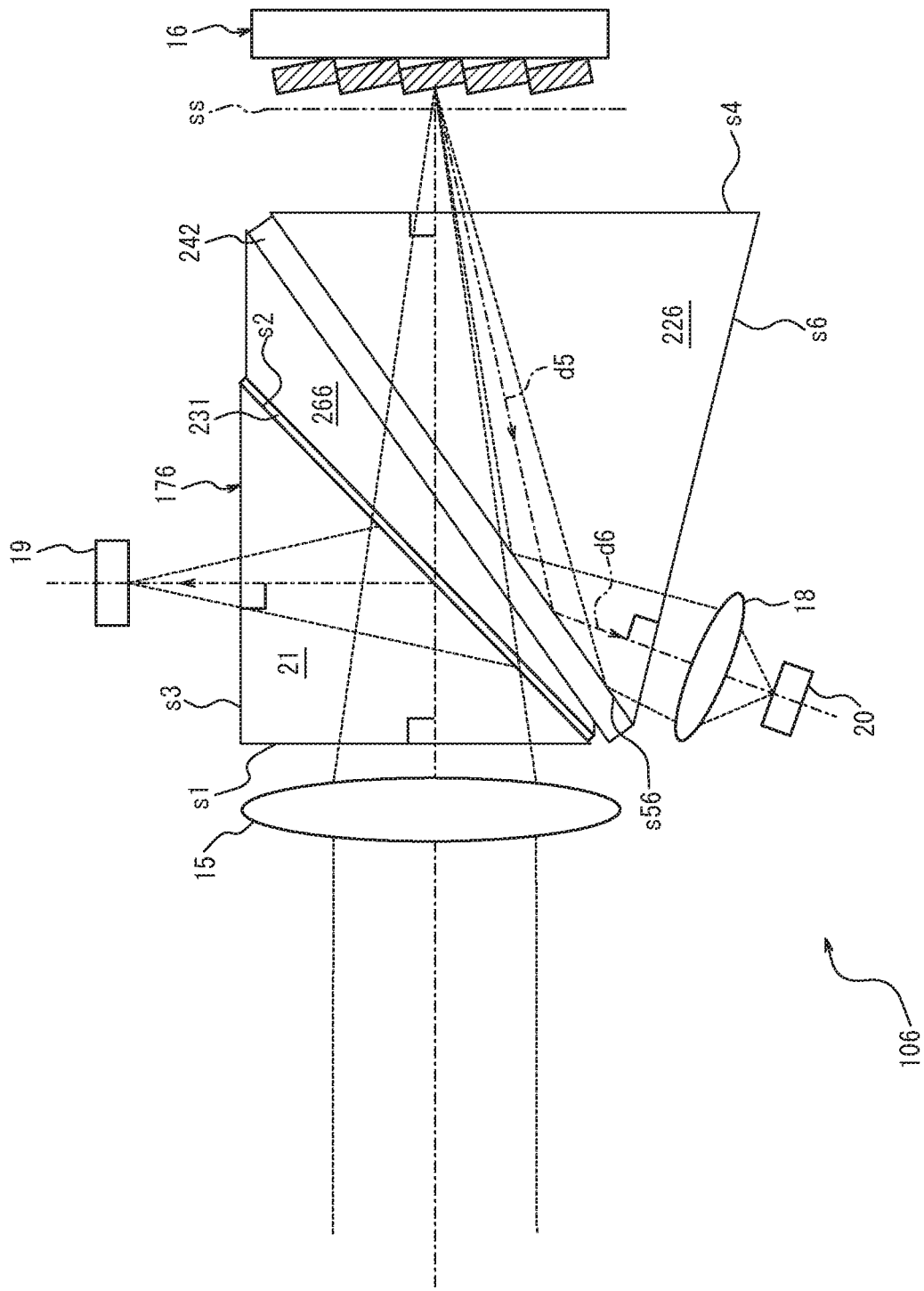
FIG. 15 is a configuration diagram schematically illustrating an electromagnetic wave detection apparatus according to an eighth embodiment.

As illustrated in FIG. 15, an electromagnetic wave detection apparatus 106 according to the eighth embodiment includes a first imaging unit 15, a first propagation unit 16, a second propagation unit 176, a second imaging unit 18, a first detector 19, and a second detector 20. Other than the electromagnetic wave detection apparatus 106, the configuration and functions of an information acquisition system 11 according to the eighth embodiment are the same as in the first embodiment. The configuration and functions other than the second propagation unit 176 in the eighth embodiment are the same as in the first embodiment.

In the eighth embodiment, the second propagation unit 176 includes at least a first surface s1, a second surface s2, a third surface s3, a fourth surface s4, a fifth surface s56, and a sixth surface s6, like the first embodiment. In the eighth embodiment, the configuration and the functions of the first surface s1, the second surface s2, the third surface s3, the fourth surface s4, and the sixth surface s6 are the same as in the first embodiment. In the eighth embodiment, the configuration and the functions of the fifth surface s56 other than the object in contact with the fifth surface s56 are the same as in the seventh embodiment.

The second propagation unit 176 in the eighth embodiment includes a total internal reflection prism and includes a first prism 21, a second prism 226, a third prism 266, a first intermediate layer 231, and a second intermediate layer 242. The configuration and functions of the first prism 21 and the first intermediate layer 231 are the same as in the third embodiment. The actual structure of the second prism 226 and the third prism 266, the arrangement thereof relative to the first prism 21, and the functions thereof are the same as in the seventh embodiment. Accordingly, the first intermediate layer 231 may be arranged between the first prism 21 and the second intermediate layer 242. Furthermore, the first intermediate layer 231 may include the second surface s2 along the interface with the first prism 21.

Figure 16:
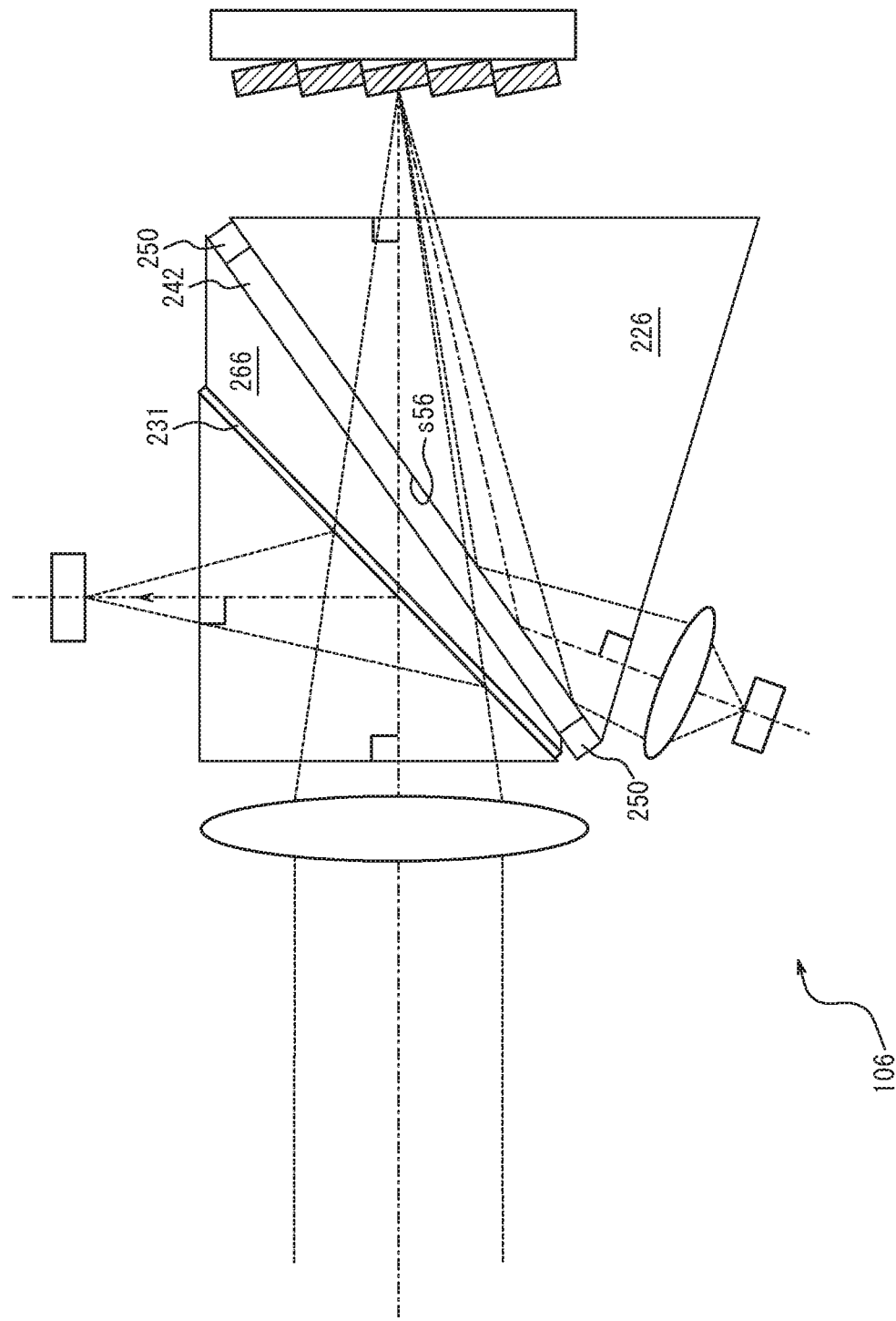
FIG. 16 is a configuration diagram schematically illustrating a modification to the electromagnetic wave detection apparatus according to the eighth embodiment.

In the eighth embodiment, the configuration and the functions of the second intermediate layer 242 are the same as in the fourth embodiment. Accordingly, as in the fourth embodiment, the second intermediate layer 242 has a refractive index smaller than the refractive index of the second prism 226 and is, for example, a vacuum or is at least one of a gas, liquid, or solid with a smaller refractive index than the second prism 226. In a configuration in which the second intermediate layer 242 is a gas or liquid, spacers 250 may be provided at the outer edges of the third prism 266 and the fifth surface s56 of the second prism 226, as illustrated in FIG. 16, and the second intermediate layer 242 may be formed by filling the inside with gas or liquid. The second intermediate layer 242 in the eighth embodiment may include an air layer or a prism, for example.

Although the matter of the present disclosure has been explained using the accompanying drawings and examples, it is to be noted that various changes and modifications will be apparent to those of ordinary skill in the art based on the present disclosure. Therefore, such changes and modifications are to be understood as included within the scope of the disclosure.

For example, in the first through eighth embodiments, the irradiator 12, the scanner 13, and the controller 14 form the information acquisition system 11 along with the electromagnetic wave detection apparatus 10, 100, 101, 102, 103, 104, 105, 106, but the electromagnetic wave detection apparatus 10, 100, 101, 102, 103, 104, 105, 106 may be configured to include at least one of these components.

In the first through eighth embodiments, the first propagation unit 16 can switch the propagation direction of the electromagnetic waves incident on the reference surface ss between two directions, i.e. the first selected direction ds1 and the second selected direction ds2, but the first propagation unit 16 may instead be capable of switching the propagation direction among three or more directions.

In the first propagation unit 16 of the first through eighth embodiments, the first state is the first reflective state of reflecting electromagnetic waves incident on the reference surface ss in the first selected direction ds1, and the second state is the second reflective state of reflecting these electromagnetic waves in the second selected direction ds2, but this configuration is not limiting.

Figure 17:
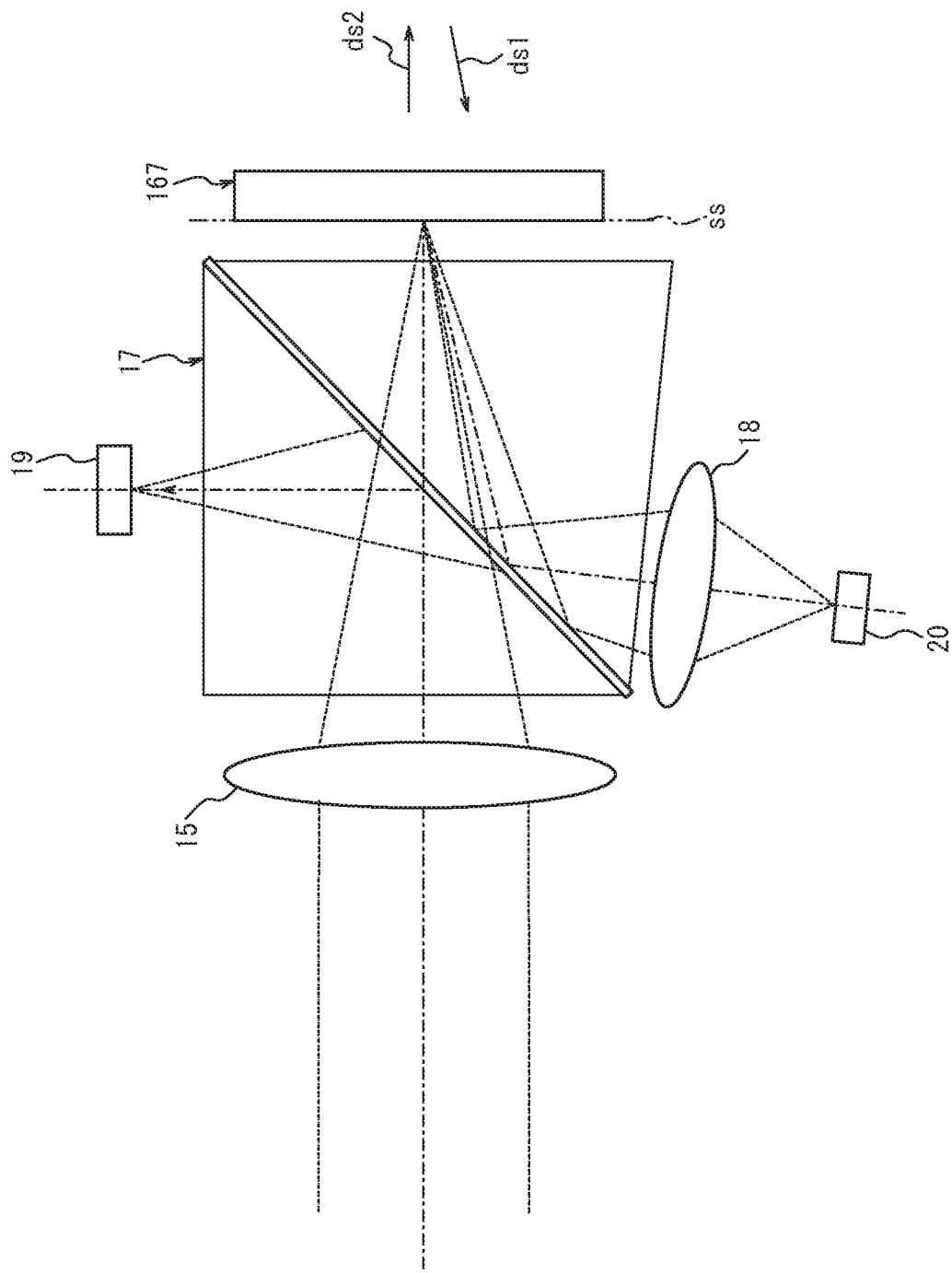
FIG. 17 is a configuration diagram schematically illustrating a modification to the electromagnetic wave detection apparatus according to the first embodiment.

For example, as illustrated in FIG. 17, the second state may be a transmitting state for transmitting the electromagnetic waves incident on the reference surface ss so that the electromagnetic waves propagate in the second selected direction ds2. In greater detail, a first propagation unit 167 may include a shutter, on each pixel px, that has a reflecting surface that reflects electromagnetic waves in the first selected direction ds1. The first propagation unit 167 with this configuration can open and close the shutter of each pixel px to switch each pixel px between the reflecting state that is the first state and the transmitting state that is the second state.

An example of the first propagation unit 167 with such a configuration is a propagation unit that includes a MEMS shutter including a plurality of openable shutters arranged in an array. Another example of the first propagation unit 167 is a propagation unit that includes a liquid crystal shutter capable of switching, in accordance with liquid crystal orientation, between the reflecting state for reflecting electromagnetic waves and the transmitting state for transmitting electromagnetic waves. The first propagation unit 167 with this configuration can switch each pixel px between the reflecting state as the first state and the transmitting state as the second state by switching the liquid crystal orientation of each pixel px.

In the first through the eighth embodiments, the information acquisition system 11 is configured so that the scanner 13 scans the beam of electromagnetic waves emitted by the irradiator 12, thereby causing the second detector 20 to work together with the scanner 13 and function as a scanning-type active sensor. The information acquisition system 11 is not, however, limited to this configuration. For example, similar effects to those of the first through the eighth embodiments can be obtained without inclusion of the scanner 13 when the irradiator 12 includes a plurality of irradiation sources capable of emitting electromagnetic waves radially. This irradiator 12 is configured to function as a scanning-type active sensor by phased scanning in which the irradiator 12 emits electromagnetic waves from each irradiation source while shifting the emission timing. As another example, the information acquisition system 11 can achieve similar effects to those of the first through the eighth embodiments, without inclusion of the scanner 13, by emitting electromagnetic waves radially from the irradiator 12 and acquiring information without scanning.

In the information acquisition system 11 of the first through the eighth embodiments, the first detector 19 is a passive sensor, and the second detector 20 is an active sensor. The information acquisition system 11 is not, however, limited to this configuration. For example, similar effects as in the first through the eighth embodiments can be achieved in the information acquisition system 11 when the first detector 19 and the second detector 20 are both active sensors or both passive sensors. When the first detector 19 and the second detector 20 are both active sensors, the irradiators 12 that emit electromagnetic waves at the object ob may be different or the same. Furthermore, different irradiators 12 may emit the same type or different types of electromagnetic waves.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in any combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

REFERENCE SIGNS LIST 10, 100, 101, 102, 103, 104, 105, 106 Electromagnetic wave detection apparatus
11 Information acquisition system
12 Irradiator
13 Scanner
14 Controller
15 First imaging unit
15', 15" Primary imaging optical system
16, 167 First propagation unit
17, 170, 171, 172, 173, 174, 175, 176, 17' Second propagation unit
18 Second imaging unit
18', 18" Secondary imaging optical system
19 First detector
20 Second detector
21 First prism
22, 220, 221, 223, 224, 225, 226 Second prism
23, 230, 231 First intermediate layer
240, 242 Second intermediate layer
250 Spacer
261, 262, 263, 264, 265, 266 Third prism
d1, d2, d3, d4, d5, d6 First direction, second direction, third direction, fourth direction, fifth direction, sixth direction
ds1, ds2 First selected direction, second selected direction
ob Object
px Pixel
s1, s2, s3, s4, s6 First surface, second surface, third surface, fourth surface, sixth surface
s5, s50, s51, s53, s54, s55, s56 Fifth surface ss Reference surface

The invention claimed is:

1. An electromagnetic wave detection apparatus comprising:
a first propagation unit comprising a plurality of pixels along a reference surface and configured to propagate electromagnetic waves incident on the reference surface in a particular direction at each pixel of the plurality of pixels;
a second propagation unit comprising a first surface configured to propagate electromagnetic waves incident from a first direction in a second direction, a second surface configured to separate the electromagnetic waves propagated in the second direction and propagate the electromagnetic waves in a third direction and a fourth direction, a third surface configured to emit the electromagnetic waves propagated in the third direction, a fourth surface configured to emit the electromagnetic waves propagated in the fourth direction towards the reference surface and to propagate electromagnetic waves incident again from the reference surface in a fifth direction, a fifth surface configured to propagate the electromagnetic waves propagated in the fifth direction in a sixth direction, and a sixth surface configured to emit the electromagnetic waves propagated in the sixth direction;

a first detector configured to detect the electromagnetic waves emitted from the third surface; and a second detector configured to detect the electromagnetic waves emitted from the sixth surface; and wherein the second propagation unit comprises a first prism, a second prism, a third prism, and a first intermediate layer;

wherein the first intermediate layer is disposed between the first prism and the third prism and comprises the second surface along an interface with the first prism;

wherein the third prism is disposed between the first intermediate layer and the second prism;

wherein the first surface comprises a surface on the first prism;

wherein the third surface comprises a different surface than the surface on the first prism;

wherein the fourth surface comprises a surface on the second prism;

wherein the fifth surface comprises an interface between the second prism and the third prism; and wherein the sixth surface comprises a different surface than the surface on the second prism.

2. The electromagnetic wave detection apparatus of claim 1, further comprising a first imaging unit configured to form an image from the electromagnetic waves incident from the first direction and then propagate the electromagnetic waves towards the first surface.

3. The electromagnetic wave detection apparatus of claim 2, wherein the first imaging unit is configured to form the image on a detection surface of the first detector via the second surface.

4. The electromagnetic wave detection apparatus of claim 2, further comprising a second imaging unit configured to form an image from the electromagnetic waves emitted from the sixth surface and propagate the image towards the second detector.

5. The electromagnetic wave detection apparatus of claim 1, wherein the first surface is configured to transmit or refract the electromagnetic waves incident from the first direction in the second direction.

6. The electromagnetic wave detection apparatus of claim 1, wherein among the electromagnetic waves propagated in the second direction, the second surface is configured to propagate electromagnetic waves of a particular wavelength in the third direction and to propagate electromagnetic waves of other wavelengths in the fourth direction.

7. The electromagnetic wave detection apparatus of claim 1, wherein the fourth surface is configured to transmit or refract the electromagnetic waves incident again from the reference surface in the fifth direction.

8. The electromagnetic wave detection apparatus of claim 1, wherein the fifth surface is configured to subject the electromagnetic waves propagated in the fifth direction to internal reflection and propagate the electromagnetic waves in the sixth direction.

9. The electromagnetic wave detection apparatus of claim 1, wherein an angle of incidence on the second surface of the electromagnetic waves propagated in the second direction and an angle of incidence on the fifth surface of the electromagnetic waves incident again from the fourth surface are different.

10. The electromagnetic wave detection apparatus of claim 1, wherein the first propagation unit is configured to switch the each pixel between a first reflecting state of reflecting electromagnetic waves incident on the reference surface in the first direction and a second reflecting state of reflecting electromagnetic waves incident on the reference surface in a different direction than the first direction.

11. The electromagnetic wave detection apparatus of claim 1, further comprising a controller configured to acquire information related to surroundings based on an electromagnetic wave detection result from the first detector and the second detector.

12. An electromagnetic wave detection apparatus comprising:

a first propagation unit comprising a plurality of pixels along a reference surface and configured to propagate electromagnetic waves incident on the reference surface in a particular direction at each pixel of the plurality of pixels;

a second propagation unit comprising a first surface configured to propagate electromagnetic waves incident from a first direction in a second direction, a second surface configured to separate the electromagnetic waves propagated in the second direction and propagate the electromagnetic waves in a third direction and a fourth direction, a third surface configured to emit the electromagnetic waves propagated in the third direction, a fourth surface configured to emit the electromagnetic waves propagated in the fourth direction towards the reference surface and to propagate electromagnetic waves incident again from the reference surface in a fifth direction, a fifth surface configured to propagate the electromagnetic waves propagated in the fifth direction in a sixth direction, and a sixth surface configured to emit the electromagnetic waves propagated in the sixth direction;

a first detector configured to detect the electromagnetic waves emitted from the third surface; and a second detector configured to detect the electromagnetic waves emitted from the sixth surface; and wherein the second propagation unit comprises a first prism, a second prism, a third prism, a first intermediate layer, and a second intermediate layer;

wherein the first intermediate layer is disposed between the first prism and the second intermediate layer, and comprises the second surface along an interface with the first prism;

wherein the second intermediate layer is disposed between the second prism and the third prism;

wherein the first surface comprises a surface on the first prism;

wherein the third surface comprises a different surface than the surface on the first prism;

wherein the fourth surface comprises a surface on the second prism;

wherein the fifth surface comprises an interface between the second intermediate layer and the second prism; and wherein the sixth surface comprises a different surface than the surface on the second prism.

13. An electromagnetic wave detection apparatus comprising:

a first propagation unit comprising a plurality of pixels along a reference surface and configured to propagate electromagnetic waves incident on the reference surface in a particular direction at each pixel of the plurality of pixels;

a second propagation unit comprising a first surface configured to propagate electromagnetic waves incident from a first direction in a second direction, a second surface configured to separate the electromagnetic waves propagated in the second direction and propagate the electromagnetic waves in a third direction and a fourth direction, a third surface configured to emit the electromagnetic waves propagated in the third direction, a fourth surface configured to emit the electromagnetic waves propagated in the fourth direction towards the reference surface and to propagate electromagnetic waves incident again from the reference surface in a fifth direction, a fifth surface configured to propagate the electromagnetic waves propagated in the fifth direction in a sixth direction, and a sixth surface configured to emit the electromagnetic waves propagated in the sixth direction;

a first detector configured to detect the electromagnetic waves emitted from the third surface; and a second detector configured to detect the electromagnetic waves emitted from the sixth surface; and wherein the second propagation unit comprises a first prism, a second prism, a first intermediate layer, and a second intermediate layer;

wherein the first intermediate layer is disposed between the first prism and the second prism, and comprises the second surface along an interface with the first prism;

wherein the first surface comprises a surface on the first prism;

wherein the third surface comprises a different surface than the surface on the first prism;

wherein the fourth surface comprises a surface on the second prism;

wherein the fifth surface comprises an interface between the second intermediate layer and the second prism; and wherein the sixth surface comprises a different surface than the surface on the second prism.

* * * * *